United States Patent
Hashimoto et al.

(10) Patent No.: US 10,864,855 B2
(45) Date of Patent: Dec. 15, 2020

(54) IMAGING CONTROL APPARATUS, METHOD FOR CONTROLLING IMAGING CONTROL APPARATUS, AND MOBILE BODY

(71) Applicant: Sony Semiconductor Solutions Corporation, Kanagawa (JP)

(72) Inventors: Hirokazu Hashimoto, Kanagawa (JP); Hideaki Imai, Kanagawa (JP); Noribumi Shibayama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/496,647

(22) PCT Filed: Mar. 16, 2018

(86) PCT No.: PCT/JP2018/010397
§ 371 (c)(1),
(2) Date: Sep. 23, 2019

(87) PCT Pub. No.: WO2018/180579
PCT Pub. Date: Oct. 4, 2018

(65) Prior Publication Data
US 2020/0108774 A1   Apr. 9, 2020

(30) Foreign Application Priority Data

Mar. 31, 2017  (JP) .................................. 2017-070079

(51) Int. Cl.
*H04N 7/18* (2006.01)
*B60R 1/00* (2006.01)
*H04N 13/10* (2018.01)

(52) U.S. Cl.
CPC ............... *B60R 1/00* (2013.01); *H04N 13/10* (2018.05); *B60R 2300/105* (2013.01); *B60R 2300/107* (2013.01); *B60R 2300/301* (2013.01)

(58) Field of Classification Search
CPC ............... B60R 1/00; B60R 2300/301; B60R 2300/107; B60R 2300/105; H04N 13/10;
(Continued)

(56) References Cited

U.S. PATENT DOCUMENTS 9,446,713 B2 * 9/2016 Lu ........................... B60R 1/002
2004/0218042 A1 * 11/2004 Kanada .................. H04N 7/183
348/148

(Continued)

FOREIGN PATENT DOCUMENTS

| JP | 59-201114 A | 11/1984 |
|---|---|---|
| JP | 2008-009906 A | 1/2008 |

(Continued)

OTHER PUBLICATIONS

Seo et al, Omnidirectional Stereo vision bases vehicle detection and distance measurement for driver assistance system (Year: 2013).*

(Continued)

*Primary Examiner* — Shan E Elahi
(74) *Attorney, Agent, or Firm* — Wolf, Greenfield & Sacks, P.C.

(57) ABSTRACT

The present disclosure relates to an imaging control apparatus, a method for controlling the imaging control apparatus, and a mobile body that can improve the distance measurement accuracy of a stereo camera mounted in a vehicle.

A set of cameras included in a stereo camera system is arranged in line, on a side surface of a main body of a vehicle, in a vertical direction relative to a road surface. Further, in order from a front side of columns of pixels (Continued)

arranged in an array, imaged pixel signals are sequentially read in the vertical direction in units of pixels for each of the columns of the pixels. The present disclosure can be applied to an in-vehicle system.

11 Claims, 17 Drawing Sheets

(58) Field of Classification Search
CPC ...... H04N 7/18; H04N 13/271; H04N 13/239; H04N 2013/0081; G06K 9/00791; G01C 3/06; G01B 11/00
USPC .......................................................... 648/64
See application file for complete search history.

(56) References Cited

U.S. PATENT DOCUMENTS

| | | | | |
|---|---|---|---|---|
| 2008/0304705 | A1* | 12/2008 | Pomerleau | G06T 7/593 382/103 |
| 2011/0211045 | A1* | 9/2011 | Bollano | G06T 7/593 348/46 |
| 2012/0287232 | A1* | 11/2012 | Natroshvili | G06T 7/33 348/36 |
| 2012/0287237 | A1* | 11/2012 | Piccinelli | H04N 19/93 348/43 |
| 2014/0200759 | A1* | 7/2014 | Lu | B60D 1/245 701/28 |
| 2016/0232415 | A1* | 8/2016 | L'Heureux | G06K 9/00 |
| 2016/0360970 | A1* | 12/2016 | Tzvieli | A61B 5/6803 |
| 2017/0150183 | A1* | 5/2017 | Zhang | H04N 19/573 |
| 2018/0283851 | A1* | 10/2018 | Watanabe | G01C 3/06 |

FOREIGN PATENT DOCUMENTS

| | | |
|---|---|---|
| JP | 2011-205215 A | 10/2011 |
| JP | 2013-053962 A | 3/2013 |
| JP | 2013-070177 A | 4/2013 |
| JP | 2016-217944 A | 12/2016 |

OTHER PUBLICATIONS

Sie et al, Real time driver assistance systems via dual camera stereo vision (Year: 2019).*

International Search Report and English translation thereof dated Apr. 17, 2018 in connection with International Application No. PCT/JP2018/010397.

Written Opinion and English translation thereof dated Apr. 17, 2018 in connection with International Application No. PCT/JP2018/010397.

Extended European Search Report dated Dec. 17, 2019 in connection with European Application No. 18777554.9.

International Preliminary Report on Patentability and English translation thereof dated Oct. 10, 2019 in connection with International Application No. PCT/JP2018/010397.

* cited by examiner

IMAGING CONTROL APPARATUS, METHOD FOR CONTROLLING IMAGING CONTROL APPARATUS, AND MOBILE BODY

CROSS-REFERENCE TO RELATED APPLICATIONS

This application claims the benefit under 35 U.S.C. § 371 as a U.S. National Stage Entry of International Application No. PCT/JP2018/010397, filed in the Japanese Patent Office as a Receiving Office on Mar. 16, 2018, which claims priority to Japanese Patent Application Number JP2017-070079, filed in the Japanese Patent Office on Mar. 31, 2017, each of which is hereby incorporated by reference in its entirety.

TECHNICAL FIELD

The present disclosure relates to an imaging control apparatus, a method for controlling the imaging control apparatus, and a mobile body, and particularly, to an imaging control apparatus, a method for controlling the imaging control apparatus, and a mobile body that can realize distance measurement with high accuracy using a set of cameras arranged in the vertical direction.

BACKGROUND ART

In recent years, attention has been focused on technologies that image the periphery of a vehicle and use the imaged image for automatic driving and driving assistance.

In a proposed technology (see PTL 1), for example, a stereo camera system is mounted in a vehicle. The stereo camera system includes a set of cameras arranged in the left-right horizontal direction, and the distance to a subject is measured using the shift of the same subject in a set of images. The shift of the same subject occurs due to parallax between the cameras.

CITATION LIST

Patent Literature

[PTL 1]
Japanese Patent Laid-Open No. 2013-070177

SUMMARY

Technical Problems

Incidentally, the stereo camera system according to PTL 1 monitors the front with the set of cameras arranged in the horizontal direction at a front end portion of the vehicle. However, to make the configuration advantageous for the side monitoring from the front end portion of the vehicle, it is conceivable that a stereo camera system for monitoring the side is implemented by a set of cameras arranged in the vertical direction.

However, in the cameras included in the stereo camera system according to PTL 1, pixel signals of pixels arranged in an array are sequentially read in the vertical direction in units of rows and sequentially read in the horizontal direction for each row.

For this reason, when the subject has moved in the horizontal direction within the fields of view of the cameras, the shift of the read timing of the pixel signals occurs in units of rows and thus so-called focal plane distortion occurs where the subject that is supposed to exist at the same position in the horizontal direction is shifted.

Further, the set of cameras arranged in the vertical direction generates parallax in the vertical direction. In two images to be imaged, therefore, the subject is imaged at a shifted position in the vertical direction. This makes the read timing of the pixel signals different, shifting the subject that is supposed to exist at the same position in the horizontal direction.

As a result, there has been a risk that the same subject cannot be recognized as the subject at the same position in the horizontal direction in two images imaged by the set of cameras arranged in the vertical direction and distance measurement cannot be performed.

Accordingly, it is conceivable to realize distance measurement by adding a configuration for correcting focal plane distortion and the shift of the subject in the horizontal direction between images imaged by the set of cameras. However, adding the configuration necessary for the correction results in complicated apparatus configuration and increased cost.

The present disclosure has been made in view of the circumstances above and particularly realizes distance measurement with high accuracy using a set of cameras arranged in the vertical direction.

Solution to Problems

An imaging control apparatus according to one aspect of the present disclosure includes: a set of cameras mounted in a mobile body and included in a stereo camera system; and a detection section configured to detect a distance to an observation point in a detection range on the basis of images imaged by the set of cameras, in which the set of cameras is arranged in line, on a side surface of the mobile body, in a vertical direction relative to a road surface, and configured to sequentially read imaged pixel signals in the vertical direction in units of pixels arranged in an array.

Each of the set of cameras can read, in order from a column of pixels on a front side of the mobile body, the pixel signals in sequence in the vertical direction for each column.

Each of the set of cameras can sequentially read, in order from the column of the pixels on the front side of the mobile body, the pixel signals in a direction from bottom to top or in a direction from top to bottom in the vertical direction for each column.

The set of cameras can be arranged in line, on each of left and right side surfaces of the mobile body, in the vertical direction relative to the road surface, and the set of cameras on each of left and right of the mobile body can sequentially read, in order from the column of the pixels on the front side of the mobile body, the pixel signals in the direction from bottom to top or in the direction from top to bottom in the vertical direction for each column.

The set of cameras can be arranged in line, on each of left and right side surfaces of the mobile body, in the vertical direction relative to the road surface, and the set of cameras on one of left and right of the mobile body can sequentially read, in order from the column of the pixels on the front side of the mobile body, the pixel signals in the direction from bottom to top in the vertical direction for each column, while the set of cameras on the other one of the left and right can sequentially read, in order from the column of the pixels on the front side of the mobile body, the pixel signals in the direction from top to bottom in the vertical direction for each column.

The set of cameras can be each arranged in line, on at least any of a side surface on each of front left and front right of the mobile body, a side surface on each of center left and center right of the mobile body, and a side surface on each of rear left and rear right of the mobile body, such that parallax occurs in the vertical direction relative to the road surface.

In a case where the set of cameras is arranged in line, on the side surface on each of the front left and the front right of the mobile body or on the side surface on each of the rear left and the rear right of the mobile body, in the vertical direction relative to the road surface, each of the cameras can include a camera with an angle narrower than a predetermined angle.

In a case where the set of cameras is arranged in line, on the side surface of each of the center left and the center right of the mobile body, in the vertical direction relative to the road surface, each of the cameras can include a camera with an angle wider than a predetermined angle.

The pixels of the cameras can be arranged in an array such that a width in a horizontal direction is greater than a width in the vertical direction.

The pixels of the cameras can be arranged in an array such that a ratio of the width in the horizontal direction to the width in the vertical direction is approximately 16:9 or approximately 4:3.

Information for controlling an imaging control apparatus according to one aspect of the present disclosure includes a method for controlling the imaging control apparatus including a detection section configured to detect a distance to an observation point in a detection range on the basis of images imaged by a set of cameras mounted in a mobile body and included in a stereo camera system, the method including a step of sequentially reading, by the set of cameras, imaged pixel signals in a vertical direction in units of pixels arranged in an array, the set of cameras being arranged in line, on a side surface of the mobile body, in the vertical direction relative to a road surface.

A mobile body according to one aspect of the present disclosure includes an imaging control apparatus including: a set of cameras mounted in the mobile body and included in a stereo camera system; and a detection section configured to detect a distance to an observation point in a detection range on the basis of images imaged by the set of cameras. The set of cameras is arranged in line, on a side surface of the mobile body, in a vertical direction relative to a road surface, and configured to sequentially read imaged pixel signals in the vertical direction in units of pixels arranged in an array.

According to one aspect of the present disclosure, a distance to an observation point in a detection range is detected on the basis of images imaged by a set of cameras mounted in a mobile body and included in a stereo camera system, and the set of cameras is arranged in line, on a side surface of the mobile body, in a vertical direction relative to a road surface, and configured to sequentially read imaged pixel signals in the vertical direction in units of pixels arranged in an array.

Advantageous Effect of Invention

According to one aspect of the present disclosure, it is particularly possible to realize distance measurement with high accuracy using a set of cameras arranged in the vertical direction.

DESCRIPTION OF EMBODIMENTS

Hereinafter, preferred embodiments of the present disclosure will be described in detail with reference to the accompanying drawings. Incidentally, in the present specification and the drawings, components having substantially the same functional configuration will be assigned the same reference signs and redundant description will be omitted.

Hereinafter, modes for carrying out the present technology will be described. The description will be made in the following order.

1. Embodiment
2. Modification
3. Application Examples

1. Embodiment

<1-1. Example of Configuration of In-Vehicle System>

Figure 1:
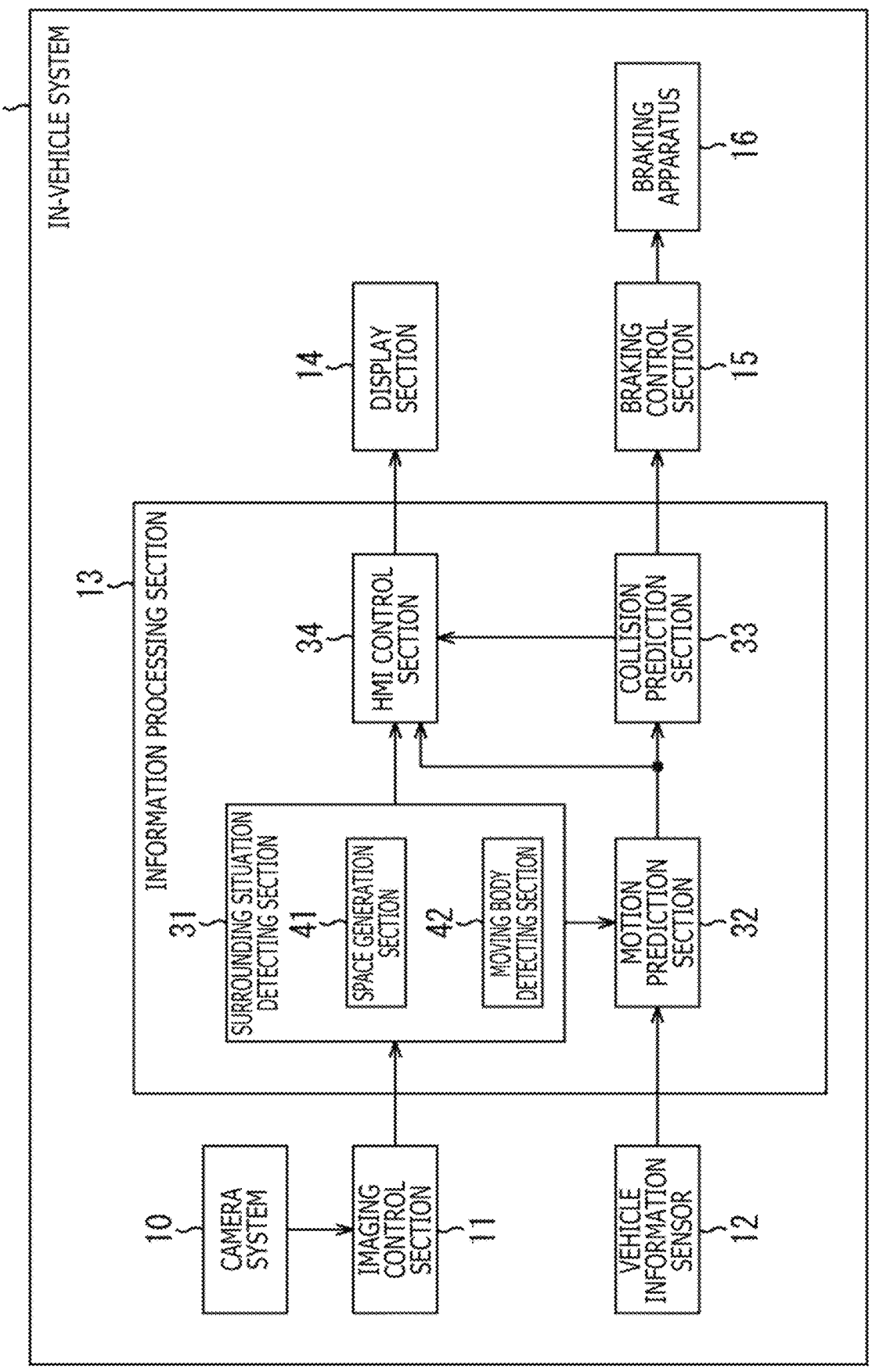
FIG. 1 is a block diagram depicting an embodiment of an in-vehicle system to which the present technology is applied.

FIG. 1 is a block diagram depicting an embodiment of an in-vehicle system to which the present technology is applied.

An in-vehicle system 1 is a system that is mounted in a vehicle and performs driving assistance. For example, the in-vehicle system 1 monitors the surroundings of a vehicle and performs processing for preventing collisions or contacts with a surrounding vehicle, bicycle, person, and the like. More specifically, the in-vehicle system 1 provides, for example, notification of the risk of collisions or contacts and controls a braking apparatus such as a brake system for avoiding collisions or contacts.

Incidentally, the vehicle in which the in-vehicle system 1 is mounted is not particularly limited and includes a three-wheeled truck, a small truck, a small passenger car, a large passenger car, a large bus, a large truck, a large special vehicle, and a small special vehicle, for example. In addition, hereinafter, the vehicle including the in-vehicle system 1 will also be referred to as an ego vehicle, while a vehicle other than the ego vehicle will also be referred to as another vehicle.

The in-vehicle system 1 includes a camera system 10, an imaging control section 11, a vehicle information sensor 12, an information processing section 13, a display section 14, a braking control section 15, and a braking apparatus 16.

The camera system 10 is a stereo camera arranged on each of side surface portions on the front left and right of the main body of the vehicle. The stereo camera includes a set of cameras arranged in the vertical direction relative to the road surface. The camera system 10 outputs images obtained by imaging side portions of the vehicle to the imaging control section 11. Incidentally, the details of the camera system 10 will be described later with reference to FIG. 4.

Incidentally, hereinafter, the images imaged by the camera system 10 will be referred to as surrounding images, and data representing the surrounding images will be referred to as surrounding image data.

The imaging control section 11 measures the distances to subjects (target objects) in respective surrounding images as distance data on the basis of the surrounding images imaged by the camera system 10, and outputs the distance data to the information processing section 13 together with the surrounding image data.

The vehicle information sensor 12 includes various types of sensors used to detect the motion of the ego vehicle. The vehicle information sensor 12 includes a speed sensor, a steering angle sensor, and a GPS (global positioning system) receiver, for example. The vehicle information sensor 12 supplies data (hereinafter referred to as vehicle sensor data) representing each of the detection results to a motion prediction section 32.

The information processing section 13 includes an ECU (Electronic Control Unit), for example. The information processing section 13 includes a surrounding situation detecting section 31, the motion prediction section 32, a collision prediction section 33, and an HMI (Human Machine Interface) control section 34.

The surrounding situation detecting section 31 detects the surrounding situation of the ego vehicle on the basis of the surrounding image data and the distance data. The surrounding situation detecting section 31 includes a space generation section 41 and a moving body detecting section 42.

The space generation section 41 generates a three-dimensional space map illustrating the shapes, positions, and the like of objects in the surroundings of the ego vehicle on the basis of the surrounding image data and the distance data. The space generation section 41 supplies the three-dimensional space map to the motion prediction section 32 and the HMI control section 34. In addition, the space generation section 41 supplies the surrounding image data to the HMI control section 34.

The moving body detecting section 42 detects moving bodies in the surroundings of the ego vehicle on the basis of the surrounding image data and the three-dimensional space map. The moving body detecting section 42 supplies the detection result of the moving bodies to the motion prediction section 32 and the HMI control section 34.

The motion prediction section 32 predicts the motion of the ego vehicle on the basis of the vehicle sensor data. In addition, the motion prediction section 32 predicts the motion of the moving bodies in the surroundings of the ego vehicle on the basis of the three-dimensional space map and the detection result of the moving bodies. The motion prediction section 32 supplies the prediction results of the motion of the ego vehicle and the moving bodies in the surroundings of the ego vehicle to the collision prediction section 33 and the HMI control section 34.

The collision prediction section 33 predicts collisions of the moving bodies in the surroundings of the ego vehicle on the basis of the prediction results of the motion of the ego vehicle and the moving bodies in the surroundings of the ego vehicle. The collision prediction section 33 supplies the collision prediction result to the HMI control section 34 and the braking control section 15.

The HMI control section 34 controls the HMI of the ego vehicle. For example, the HMI control section 34 generates surrounding monitoring image data for displaying a surrounding monitoring image on the basis of the three-dimensional space map, the detection result of the moving bodies in the surroundings of the ego vehicle, and the results of the motion prediction and collision prediction of the moving bodies in the surroundings of the ego vehicle. The surrounding monitoring image illustrates the surrounding situation of the ego vehicle. The HMI control section 34 supplies the surrounding monitoring image data to the display section 14, causing the display section 14 to display the surrounding monitoring image. In this case, the HMI control section 34 functions as an image processing section.

The display section 14 includes various types of displays, for example. Under the control of the HMI control section 34, the display section 14 displays various types of images such as the surrounding monitoring image.

The braking control section 15 includes an ECU (Electronic Control Unit), for example. The braking control section 15 controls the braking apparatus 16 on the basis of the collision prediction result from the collision prediction section 33 to make an emergency stop of the ego vehicle, for example.

The braking apparatus 16 includes a brake system of the ego vehicle, for example.

<1-2. Arrangement Example of Cameras>

Figure 2:
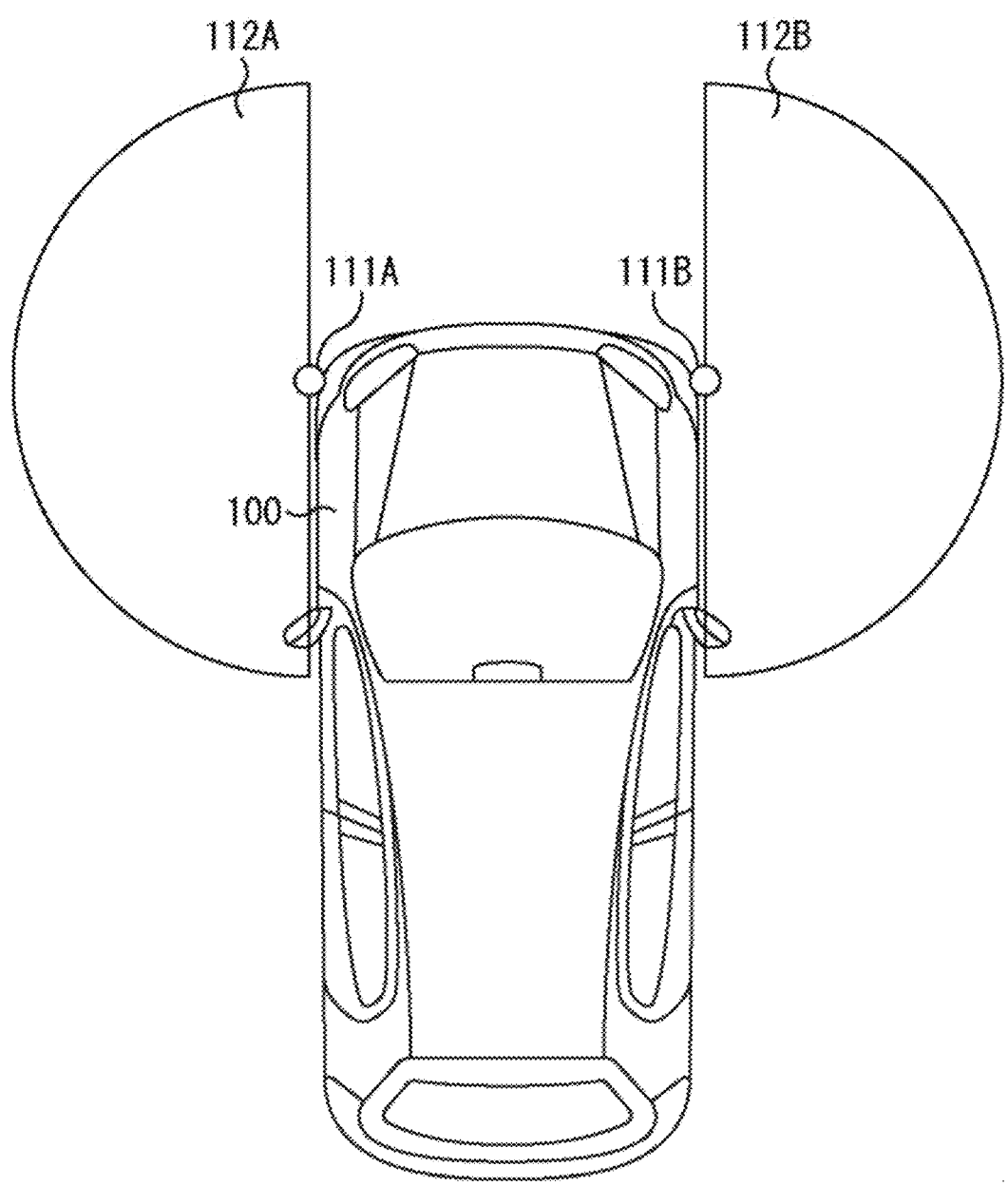
FIG. 2 is a diagram depicting an example of installation positions of cameras.

FIG. 2 depicts an arrangement example of stereo camera systems included in the camera system 10.

For example, a stereo camera system 111A is arranged on a front-left side surface portion of a front bumper of a vehicle 100. The stereo camera system 111A images a detection range 112A, which lies on the left side of the vehicle 100 including an area that is a blind spot of a driver, and supplies image data representing an image (hereinafter referred to as a left image) obtained as a result of imaging to the imaging control section 11.

For example, a stereo camera system 111B is arranged on a front-right side surface portion of the front bumper of the vehicle 100. The stereo camera system 111B images a detection range 112B, which lies in the right direction of the vehicle 100 including an area that is a blind spot of the driver, and supplies image data representing an image (hereinafter referred to as a right image) obtained as a result of imaging to the imaging control section 11.

Incidentally, hereinafter, in a case where the stereo camera systems 111A and 111B do not need to be particularly distinguished from each other, the stereo camera systems 111A and 111B will also be simply referred to as a stereo camera system 111, and the other configurations will also be referred to in a similar manner.

<1-3. Example of Detailed Appearance Configuration of Cameras>

Figure 3:
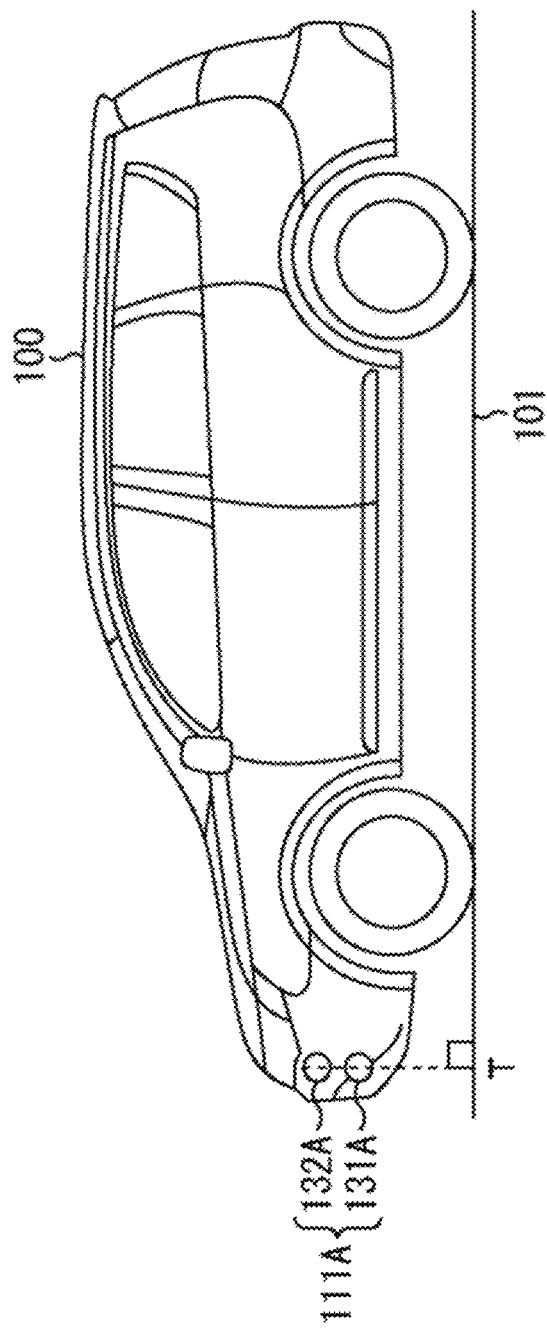
FIG. 3 is a diagram depicting an example of an appearance configuration of a stereo camera system.

As depicted in FIG. 3, the stereo camera system 111A includes two cameras 131A and 132A as a set. The cameras 131A and 132A are arranged in line in the vertical direction (that is, the longitudinal direction) on the front-left side surface of the vehicle 100. That is, the cameras 131A and 132A are arranged in a plane perpendicular to a reference surface (a road surface 101) such that parallax occurs in the height (vertical) direction.

Incidentally, although the stereo camera system 111A is installed only on the left side of the vehicle 100 in FIG. 3, the stereo camera system 111B including cameras 131B and 132B is actually installed in a similar manner on the right side as well.

The optical axis of the camera 131A and the optical axis of the camera 132A are oriented in a direction (front direction in the figure) perpendicular to a dotted line in FIG. 3 passing through the camera 131A and the camera 132A. The dotted line in FIG. 3, which is perpendicular to the road surface 101 and passes through the center point of the stereo camera system 111, intersects with a point T on the road surface 101. That is, the point T is a point on the road surface 101 immediately below the stereo camera system 111A (that is, immediately below the vehicle 100).

<1-4. Configuration of Imaging Control Section>

Figure 4:
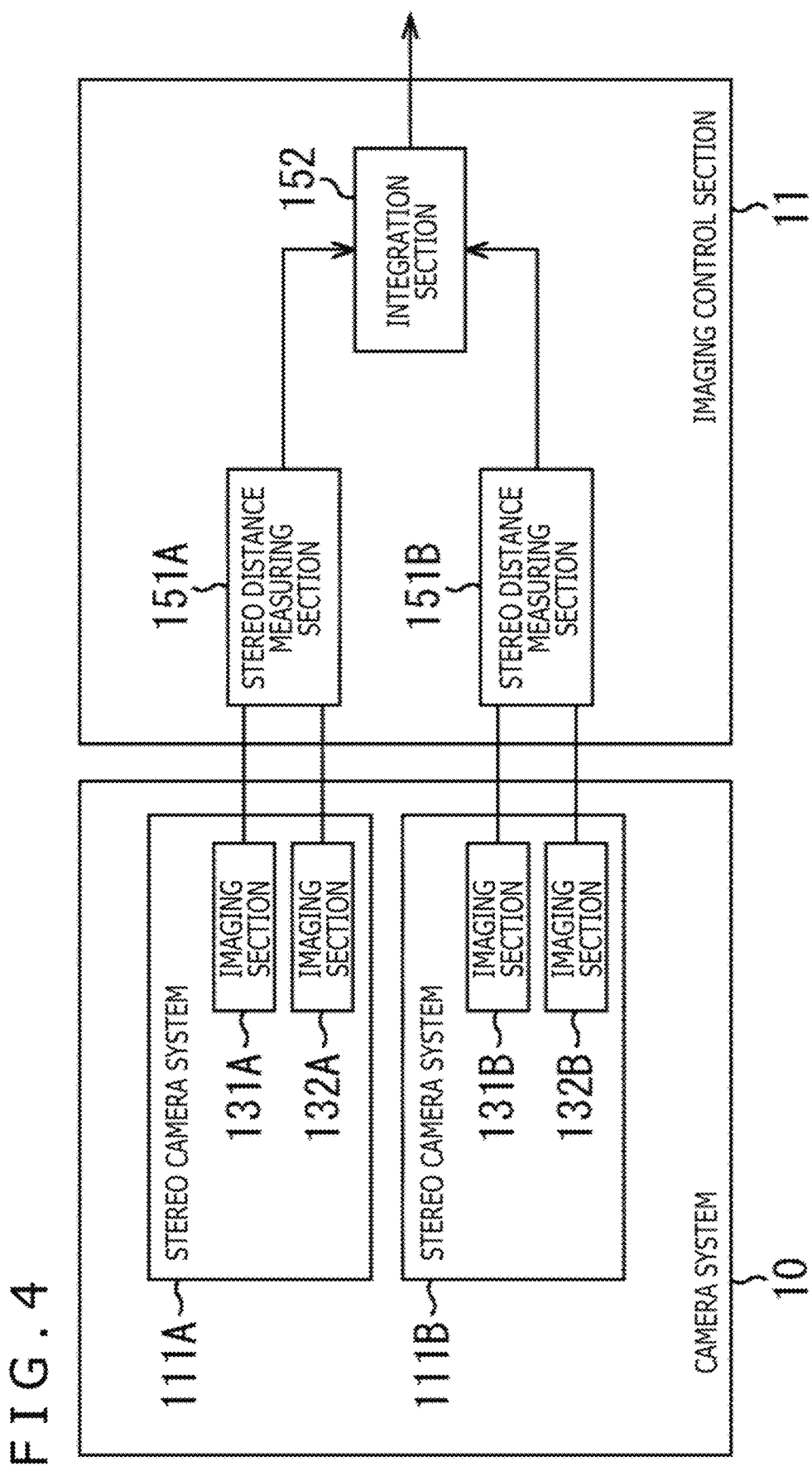
FIG. 4 is a block diagram depicting an example of a configuration of an imaging control section.

Next, the detailed configuration of the imaging control section 11 will be described with reference to a block diagram in FIG. 4.

The camera system 10 includes the stereo camera systems 111A and 111B. The stereo camera system 111A includes the camera 131A and the camera 132A.

Similarly, the stereo camera system 111B includes the cameras 131B and 132B.

Image data of images imaged by the cameras 131A and 132A are supplied to a stereo distance measuring section 151A. Image data of images imaged by the imaging sections 131B and 132B are supplied to a stereo distance measuring section 151B.

The imaging control section 11 includes the stereo distance measuring sections 151A and 151B and an integration section 152.

The stereo distance measuring section 151A measures the distance to a subject (target object) in the detection range 112A (FIG. 2) on the left side of the vehicle 100 and outputs the distance to the integration section 152. The stereo distance measuring section 151B measures the distance to a subject (target object) in the detection range 112B on the right side of the vehicle 100 and outputs the distance to the integration section 152.

The integration section 152 obtains and integrates the outputs of the stereo distance measuring sections 151A and 151B to grasp and output the state of the entire periphery of the vehicle 100 to the surrounding situation detecting section 31 as surrounding image data and distance data.

<1-5. Configuration of Stereo Distance Measuring Section>

Figure 5:
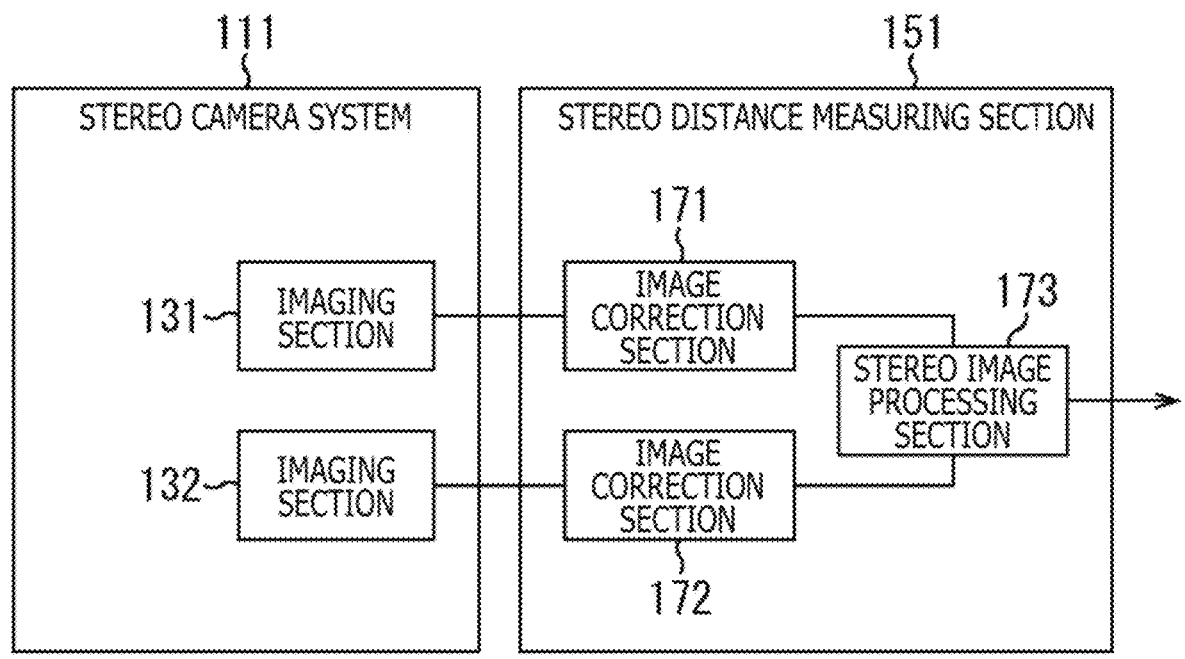
FIG. 5 is a block diagram depicting a configuration of a stereo distance measuring section.

Next, an example of a configuration of the stereo distance measuring section 151 in FIG. 4 will be described with reference to a block diagram in FIG. 5.

The stereo distance measuring section 151 includes image correction sections 171 and 172 and a stereo image processing section 173. Each of the outputs of the cameras 131 and 132 of the stereo camera system 111 is supplied to a corresponding one of the image correction section 171 and the image correction section 172, in which lens aberration and the like are corrected as preprocessing. For example, in a case where the cameras 131 and 132 include wide-angle lenses and can image respective detection ranges with a wider viewing angle than a normal camera, the imaged images include distortion. To calculate the distance, each of the image correction sections 171 and 172 corrects the distortion and executes processing of forming a plane image by projecting the image on a plane. The stereo image processing section 173 detects the distance to the target object from the outputs of the image correction section 171 and the image correction section 172. That is, the stereo image processing section 173 detects the target object depicted in one of the images imaged by the cameras 131 and 132 from the other image, and calculates the distance from the shift of the position.

Incidentally, a wide-angle camera is, for example, a camera including a lens of 35 mm or less, particularly a lens of 28 mm or less, in 35 mm conversion. Alternatively, the wide-angle camera may be, for example, a camera capable of imaging at a viewing angle of 60 degrees or more, particularly 120 degrees or more, or 150 degrees or more. The viewing angle can also be 180 degrees or more. Particularly, a wide-angle lens with a wide viewing angle may be employed. Alternatively, the camera may include a fisheye lens (fθ lens) or may be a fisheye camera, or may include an ultra-wide-angle lens or may be a camera called an ultra-wide-angle camera or the like.

<1-6. Coordinate System of Stereo Camera System>

Figure 6:
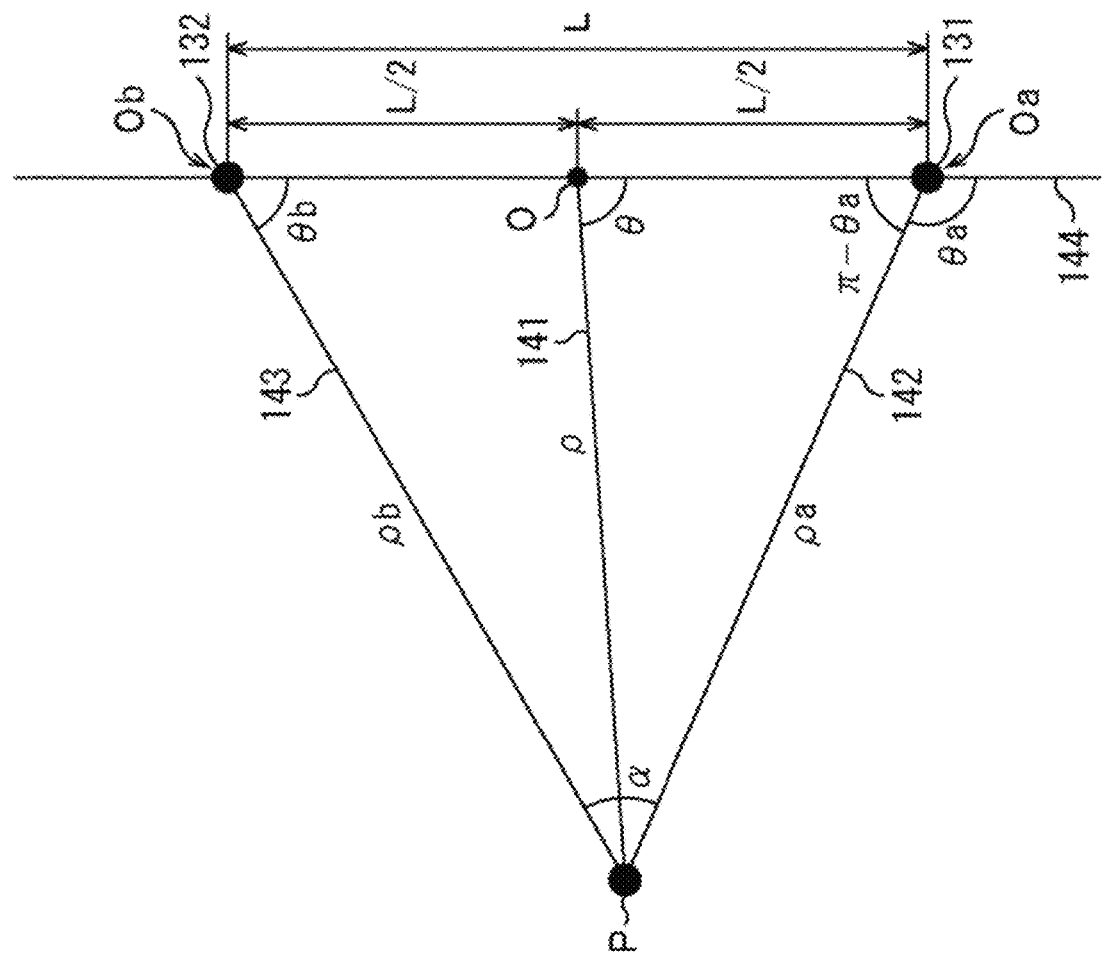
FIG. 6 is a diagram explaining principle of distance measurement by the stereo camera system.

Next, the coordinate system of the stereo camera system 111 will be described with reference to FIG. 6. The coordinate system of the stereo camera system 111 is defined as depicted in FIG. 6.

The center point of one camera 131 of the stereo camera system 111 including the two cameras 131 and 132 arranged in the vertical direction is assumed to be Oa, while the center point of the other camera 132 is assumed to be Ob. A midpoint between the center point Oa and the center point Ob (that is, the center point of the stereo camera system 111) is assumed to be O. A target point for imaging is assumed to be P. A distance (baseline length) between the center point Oa and the center point Ob is assumed to be L. Of the angles between a straight line 141 and a straight line 144, the angle on the lower side in the figure (the angle between the straight line 141 and a line segment of the straight line 144 on the side lower than the center point O) is assumed to be θ. The straight line 141 connects the target point P and the center point O. The straight line 144 passes through the center point Oa and the center point Ob. That is, the angle θ is the angle between the target point P for imaging and the stereo camera system 111. Incidentally, the target point represents a target object (subject) to be imaged, that is, to be monitored. For example, the target point schematically represents a person, an obstacle, another vehicle, or the like on the periphery of the vehicle 100 as a point.

Of the angles between the straight line 144 and a straight line 142 connecting the target point P and the center point Oa, the angle on the lower side in the figure (the angle between the straight line 142 and a line segment of the straight line 144 on the side lower than the center point Oa in the figure) is assumed to be θa. Of the angles between the straight line 144 and a straight line 143 connecting the target point P and the center point Ob, the angle on the lower side in the figure (the angle between the straight line 143 and a line segment of the straight line 144 on the side lower than the center point Ob in the figure) is assumed to be θb. The angle between the straight line 142 and the straight line 143 is assumed to be α. In addition, the distance between the center point O and the target point P is assumed to be ρ. The distance between the target point P and the center point Oa is assumed to be ρa. The distance between the target point P and the center point Ob is assumed to be ρb. At this time, the following formula (1) is obtained from the sine theorem.

$$\rho a/\sin \theta b = L/\sin \alpha = L/\sin(\theta a - \theta b)$$

where α=θa−θb. (1)

In addition, the distance ρ between the center point O and the target point P can be described as the following formula (2).

$$\rho \cdot \sin \theta = \rho a \cdot \sin(\pi - \theta a) = \rho a \cdot \sin \theta a \quad (2)$$

A formula (3) is obtained from the formulas (1) and (2).

$$\sin(\theta a - \theta b) = L/\rho \cdot \sin \theta a \cdot \sin \theta b/\sin \theta \quad (3)$$

Generally, it is often the case that while the distance (baseline length) L between the center point Oa and the center point Ob is approximately several cm to several tens of cm, the distance ρ from the center point O to the target point P is sufficiently great, that is, approximately several m. In this case, θ≈θa and θ≈θb hold. Further, θb<θ<θa always holds. From these conditions, the following approximate formula (4) holds.

$$\sin \theta a \cdot \sin \theta b \approx \sin^2 \theta \quad (4)$$

The following formula (5) is obtained from the formulas (3) and (4).

$$\sin(\theta a - \theta b) \approx L/\rho \cdot \sin \theta \quad (5)$$

Since the angles θa and θb are the angles of rays of the object light in the two cameras 131 and 132, the difference θa−θb is the angle difference between the rays of incident light. In stereo image processing, the distance to the target object is calculated by θa−θb. Since the baseline length L is a constant, it can be seen from the formula (5) that θa−θb is in inverse proportion to the distance ρ to the target object. Therefore, an increase in distance between the target object and the stereo camera system 111 reduces the distance measurement accuracy.

One of the major reasons for measuring the distance in the stereo camera system 111 mounted in the vehicle 100 is to detect an obstacle in the surroundings of the vehicle 100 and prevent the vehicle 100 from contacting the obstacle. Therefore, it is reasonable that the smaller the distance between the vehicle 100 and the obstacle, the higher the distance measurement accuracy.

<1-7. Stereo Camera System Using Cameras That Read Pixel Signals in Vertical Direction in Units of Rows and in Horizontal Direction in Each Row>

Next, to describe a method for reading pixel signals in the stereo camera system 111 according to the present disclosure, the stereo camera system using the cameras that sequentially read pixel signals in the vertical direction in units of rows and in the horizontal direction in each row will be described.

Figure 7:
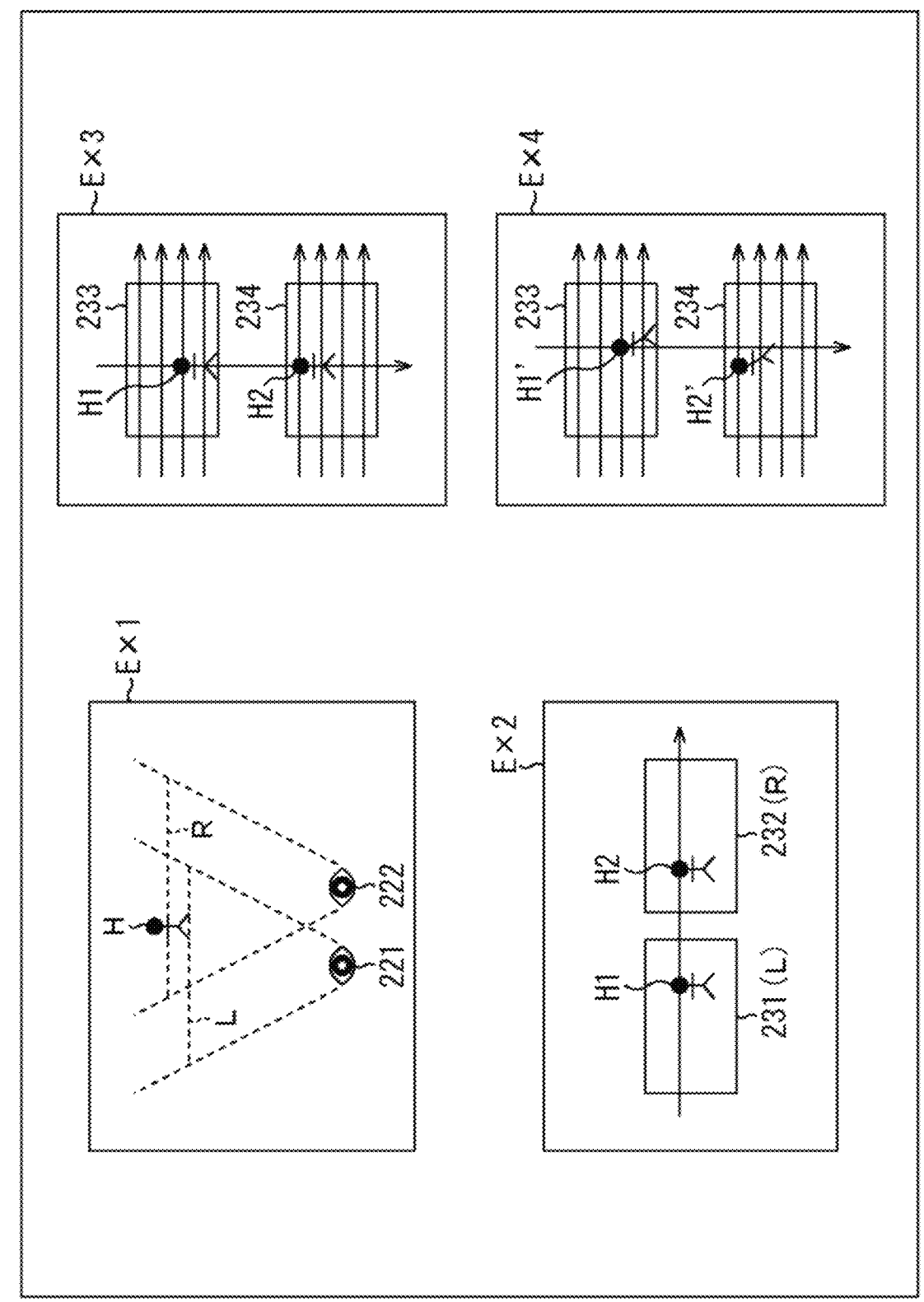
FIG. 7 is a diagram explaining focal plane distortion by the cameras of the stereo camera system.

As depicted in FIG. 7, in a case where a human visually recognizes a subject H, left and right eyes 221 and 222 individually and visually recognize the subject H, as depicted in an example Ex1. More specifically, for example, in each of the left and right eyes 221 and 222, the eye 221 which is the left eye visually recognizes the subject H in a field of view L in the figure, while the eye 222 which is the right eye visually recognizes the subject H in a field of view R in the figure. The human recognizes the shift of the subject H in the fields of view L and R as parallax and spatially recognizes the subject according to the parallax. Incidentally, although the distances of the fields of view L and R from the respective eyes 221 and 222 are different from each other in FIG. 7, the distances are made different from each other for the purpose of description. It is assumed that the distances are the same in reality.

According to the similar principle, in a case where the stereo camera system includes cameras arranged in the horizontal direction so as to correspond to the eyes 221 and 222, images 231 and 232 are imaged by the respective cameras, as depicted in an example Ex2.

The images 231 and 232 depicted in the example Ex2 include the subject H imaged as subjects H1 and H2, respectively. Incidentally, the images 231 and 232 in the example Ex2 correspond to the fields of view L and R in the example Ex1, respectively.

The shift of the subjects H1 and H2 in the horizontal direction in the images 231 and 232 is caused by parallax of the cameras imaging the respective images. The distance to the subject can be measured by the parallax corresponding to the shift of the subjects H1 and H2 in the respective images 231 and 232.

Incidentally, when the distance to the subject H is measured using the images 231 and 232, it is necessary to recognize the subjects H1 and H2 in the respective images as the same subject H.

Generally, a camera sequentially reads pixel signals in the direction from top to bottom in units of rows and sequentially reads the pixel signals from pixels adjacent in the horizontal direction from left to right in each row. Therefore, in order to recognize the subjects H1 and H2 that are the same subject H, the pixel signals of the pixels in the same row are compared with each other.

Incidentally, an arrow in the horizontal right direction across the images 231 and 232 in the example Ex2 represents that pixels in the same row are compared with each other.

By contrast, the cameras 131 and 132 are arranged in the vertical direction in the stereo camera system 111 according to the present disclosure. Therefore, in a case where the subject H is in a stationary state, images imaged by the respective cameras 131 and 132 are imaged as images 233 and 234, as depicted in an example Ex3, for example.

In the case of the images 233 and 234 in the example Ex3, even if parallax occurs in the vertical direction in the subjects H1 and H2 in the respective images 233 and 234, the pixels that are at the same position in the horizontal direction and belong to the subjects H1 and H2 can be recognized as the subject H. This is because the pixels shifted from each other in the vertical direction by parallax have the same pixel signal as long as the pixels belong to the same subject.

However, in a case where the subject H is not stationary but moves in the horizontal direction, so-called focal plane distortion occurs in the images 233 and 234 along with the movement of the subject H. For example, the subject H is imaged as subjects H1' and H2' which are the distorted subjects H1 and H2, respectively, as depicted in Ex4.

For example, a coordinate X in the horizontal direction of the images 233 and 234 is assumed to be positive in the right direction in the figure, while a coordinate Y in the vertical direction is positive in a downward direction in the figure. Pixel signals in each camera are assumed to be, for example, read in the direction from top to bottom in units of rows and in the direction from left to right in each row. A linear subject included in one long pixel column in the vertical direction is assumed to exist.

Here, in a case where the linear subject is longitudinally long and included in one pixel column and does not move, and it is assumed that a pixel (x, y) read in a column X=x in the horizontal direction in a predetermined row Y=y belongs to the subject on the straight line as depicted in the example Ex3 in FIG. 7, a pixel (x, y+1) one row below the pixel (x, y) also belongs to the linear subject.

However, for example, in a case where the linear subject is moving in the horizontal right direction and it is assumed that the pixel (x, y) read in the column X=x in the horizontal direction in the predetermined row Y=y belongs to the linear subject, the linear subject has moved in the right direction by the time the pixel (x, y+1) one row below the pixel (x, y) is read. Therefore, the pixel belonging to the subject on the straight line results in a pixel (x+α, y+1) shifted to the right side by a distance a from the coordinate x according to the moving speed of the subject on the straight line.

As for the images 233 and 234, as the row to be read proceeds in the downward direction, each of pixel signals belonging to the subjects H1 and H2 is shifted in the horizontal right direction by the distance corresponding to the moving speed of the subject H. Among the pixels belonging to the subject H, therefore, the pixels at lower rows in the respective images result in greater focal plane distortion as a whole in which a shift to the right side is large. Thus, distortion like leaning to the left relative to the subjects H1 and H2 occurs, as depicted with the subjects H1' and H2'.

Further, in the images 233 and 234, parallax occurs in the vertical direction. Thus, the larger the parallax in the subjects H1 and H2 in the vertical direction, the larger the shift in the read timing of the pixel signals. Therefore, even if the pixel signals at the same coordinate in the horizontal direction are simply compared with each other, there is a risk that it is not possible to determine whether or not the pixels belong to the same subject H.

That is, in the example Ex4, the pixels belonging to the subject H2' in the image 234 belong to rows in a more upper portion in the image than the pixels belonging to the subject H1' in the image 233. Therefore, the pixel signals of the pixels belonging to the subject H2' in the image 234 are read earlier than the pixel signals of the pixels belonging to the subject H1' in the image 233.

Consequently, the subject H2' in the image 234 is an image that is closer to the left side in the image than the subject H1' in the image 233.

As a result, even if the pixel signals of the pixels at the same coordinate in the horizontal direction of the images 233 and 234 are compared with each other, the pixels cannot be recognized as pixels common to the subject H. There is a risk that it is not possible to perform the distance measurement itself through comparison of the subjects H1' and H2' in the images 233 and 234.

That is, in a case where the stereo camera system 111 includes one set of cameras arranged such that parallax occurs in the vertical direction, and in a case where pixel signals are read sequentially in the vertical direction in units of rows and read in the horizontal direction for each row, there is a risk that it is not possible to recognize the same common subject in the images imaged by the set of cameras, disabling the distance measurement itself.

<1-8. Method for Reading Pixel Signals in Cameras Included in Stereo Camera System According to Present Disclosure>

In view of the circumstances above, the cameras 131 and 132 belonging to the stereo camera system 111 according to the present disclosure sequentially read pixel signals in the horizontal direction in units of columns and in the vertical direction for each column.

Figure 8:
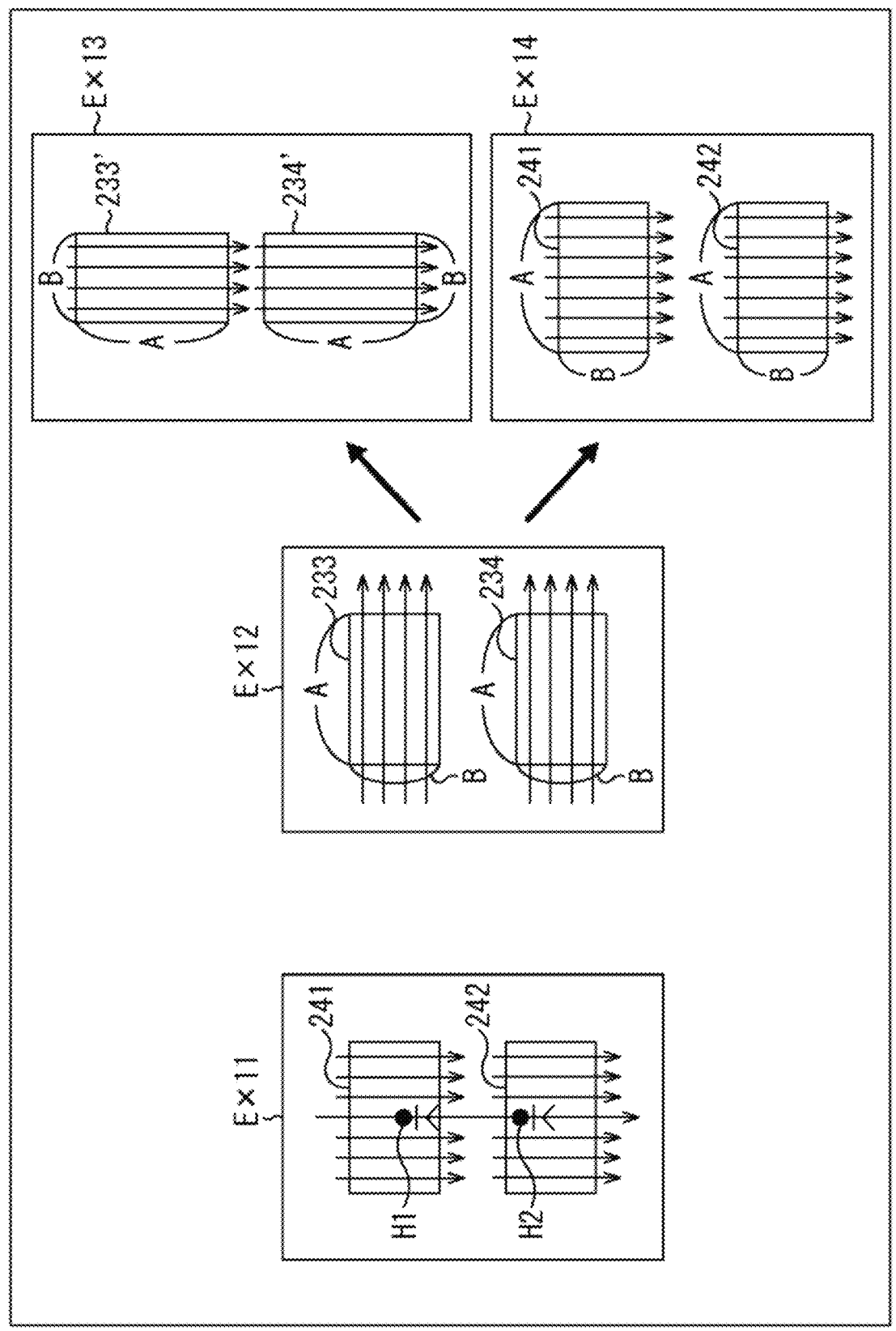
FIG. 8 is a diagram explaining an example of an order in which the cameras of the stereo camera system according to the present disclosure read pixel signals.

That is, as depicted with images 241 and 242 in an example Ex11 in FIG. 8, images imaged by the cameras 131 and 132 are generated such that pixel signals are sequentially read in the horizontal direction in units of columns and sequentially read in the vertical direction, for example, in the direction from top to bottom for each column. The cameras 131 and 132 are provided such that parallax occurs in the vertical direction.

With this configuration, for example, since a shift of the read timing of pixel signals in the same column is only the number of pixels corresponding to the parallax, it is possible to reduce the influence of the focal plane distortion.

In addition, since a shift of the read timing of the pixel signals that occurs in the vertical direction due to the parallax of the cameras 131 and 132 is also only the number of pixels corresponding to the parallax, it is also possible to reduce the shift of the subjects H1 and H2. Therefore, it is possible to recognize that the subjects H1 and H2 are the same subject H by comparing the pixel signals at the same position in the horizontal direction.

Further, as described above, since general cameras sequentially read pixel signals in the direction from top to bottom in units of rows and in the direction from left to right in each row, the images 233 and 234 as depicted in an example Ex12 in FIG. 8 are read, for example. Therefore, it is also conceivable that this is realized by turning the general cameras by 90 degrees (turning in the right direction in the figure) as depicted in an example Ex13 in FIG. 8.

However, in a case where the ratio of the length of the images 233 and 234 in the horizontal direction to the length thereof in the vertical direction is expressed by A:B, A>B holds. A typical configuration is such that the length in the horizontal direction is greater than the length in the vertical direction.

As depicted in the example Ex13, in a case where the cameras are turned by 90 degrees, the viewing angles in the horizontal direction become narrow since the length in the horizontal direction is smaller.

Therefore, as depicted in an example Ex14, images imaged by the cameras 131 and 132 included in the stereo camera system 111 according to the present disclosure are such that a ratio A:B of the length in the horizontal direction to the length in the vertical direction is, for example, 4:3 or 16:9, that is, the length in the horizontal direction is greater, and moreover, pixel signals are sequentially read in the horizontal direction in units of columns and the pixel signals are also sequentially read in the vertical direction in units of pixels in each column. With this configuration, the stereo camera system 111 according to the present disclosure suppresses the shift of the subject in the horizontal direction caused by the shift of the read timing while securing the viewing angles in the horizontal direction. This realizes the distance measurement with high accuracy.

<1-9. Specific Method for Reading Pixel Signals in Cameras>

Next, a specific method for reading the pixel signals in the cameras 131 and 132 will be described with reference to FIG. 9. Incidentally, although the method for reading the pixel signals in the camera 131 will be described in FIG. 9, the method similarly applies to the camera 132. In addition, although a pixel array included in the camera 131 includes pixels 251 including 8×6 pixels in the horizontal direction× vertical direction, the number of pixels may be other than 8×6 pixels.

Figure 9:
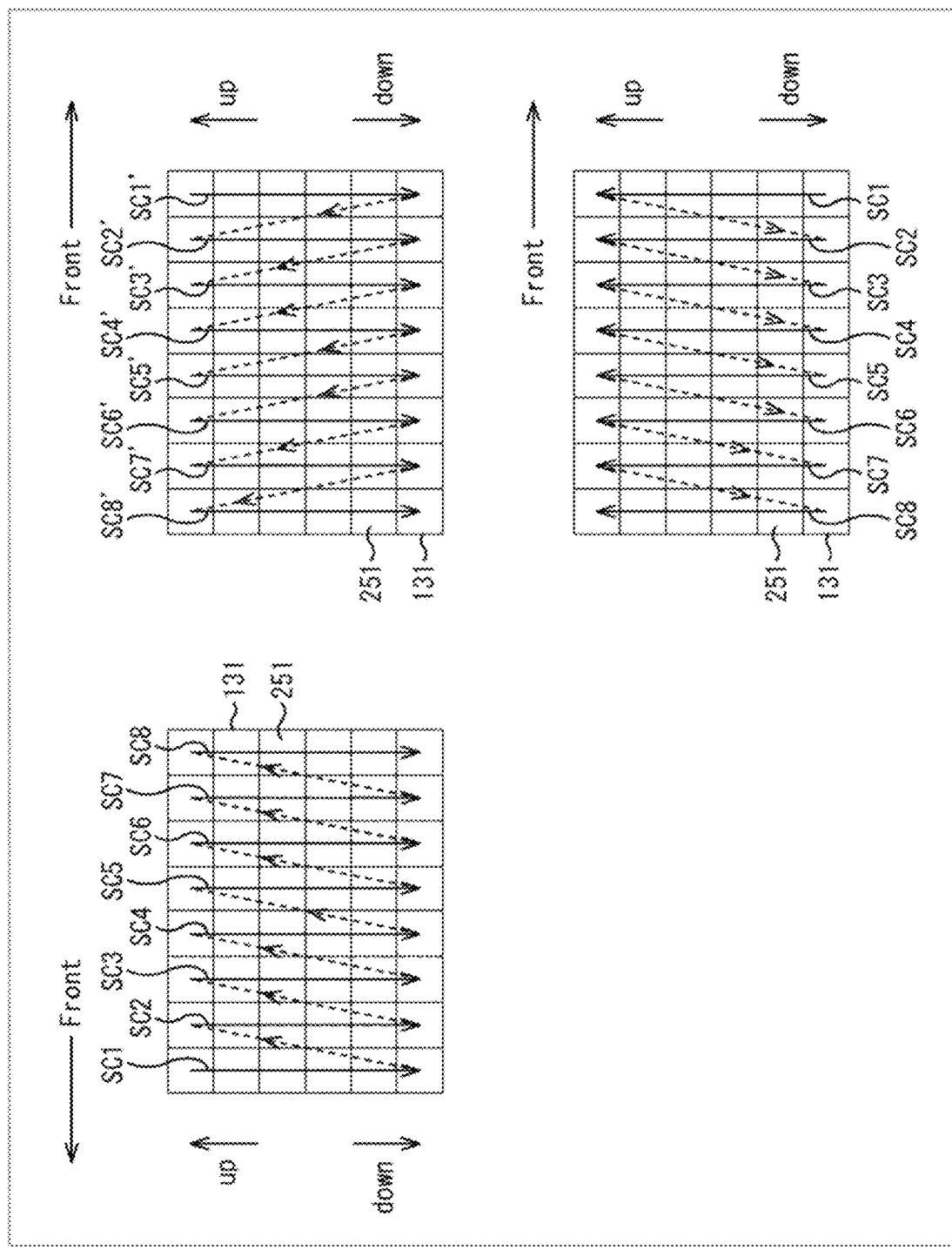
FIG. 9 is a diagram explaining an example of an order in which the camera of the stereo camera system according to the present disclosure reads pixel signals.

That is, as depicted in an upper left portion of FIG. 9, for example, in a case where the camera 131 is provided on the front-left side surface portion, first, the pixel signals of the pixels in a column SC1 on the front side of the vehicle 100 are sequentially read in the downward direction from the uppermost pixel in the figure. When the pixel signal of the lowermost pixel 251 has been read, the pixel signals are sequentially read in the downward direction from the uppermost pixel in an adjacent column SC2. After that, similarly, in order of columns SC3 to SC8, the pixel signal of the uppermost pixel and then the pixel signals of the pixels adjacent in the downward direction are sequentially read for each column. In this reading order, it is particularly possible to read the pixel signals in the pixel columns on the front side of the detection range at a higher speed in the forward movement state. By grasping the situation in the traveling direction more quickly, it is possible to realize processing corresponding to the situation in the traveling direction more quickly.

Incidentally, in the upper left portion of FIG. 9, a left portion in the figure denotes the front (Front) of the vehicle 100, an upper portion in the figure denotes an upper part (up) of the vehicle 100, and a lower portion in the figure denotes a lower part (down) of the vehicle 100.

In addition, as depicted in an upper right portion of FIG. 9, for example, in a case where the camera 131 is provided on the front-right side surface portion, the pixel signals of the pixels in a column SC1' on the front side of the vehicle 100 are sequentially read in the downward direction from the uppermost pixel in the figure. When the pixel signal of the lowermost pixel 251 has been read, the pixel signals are sequentially read in the downward direction from the uppermost pixel in an adjacent column SC2'. After that, similarly, in order of columns SC3' to SC8', the pixel signal of the uppermost pixel is read and then the pixel signals of the pixels adjacent in the downward direction are sequentially read for each column.

Incidentally, in the upper right portion of FIG. 9, a right portion in the figure denotes the front (Front) of the vehicle 100, an upper portion in the figure denotes the upper part (up) of the vehicle 100, and a lower portion in the figure denotes the lower part (down) of the vehicle 100.

In addition, in the cameras 131 in the upper left portion and the upper right portion of FIG. 9 in the described example, the pixel signals in each column are sequentially read from the uppermost pixel and then the pixels adjacent in the downward direction. However, the pixel signals may be sequentially read in the upward direction from the lowermost pixel.

Further, while the front-rear direction of the camera 131 relative to the vehicle 100 in the upper left portion of FIG. 9 is maintained, the camera 131 may be turned upside down and installed. In this manner, the camera 131 may be provided on the front-left side surface portion as depicted in a lower right portion of FIG. 9.

That is, in this case, the camera 131 to be provided on the front-right side surface portion and the camera 131 to be provided on the left side surface portion do not need to be individually configured as different cameras. Each of the cameras 131 has the same configuration and can be provided on either the left or right side surface portion.

Incidentally, while the front-rear direction of the camera 131 in the upper right portion of FIG. 9 is maintained, the camera 131 may be turned upside down and provided on the left side surface portion.

<1-10. Arrangement Example of Display Section>

Figure 10:
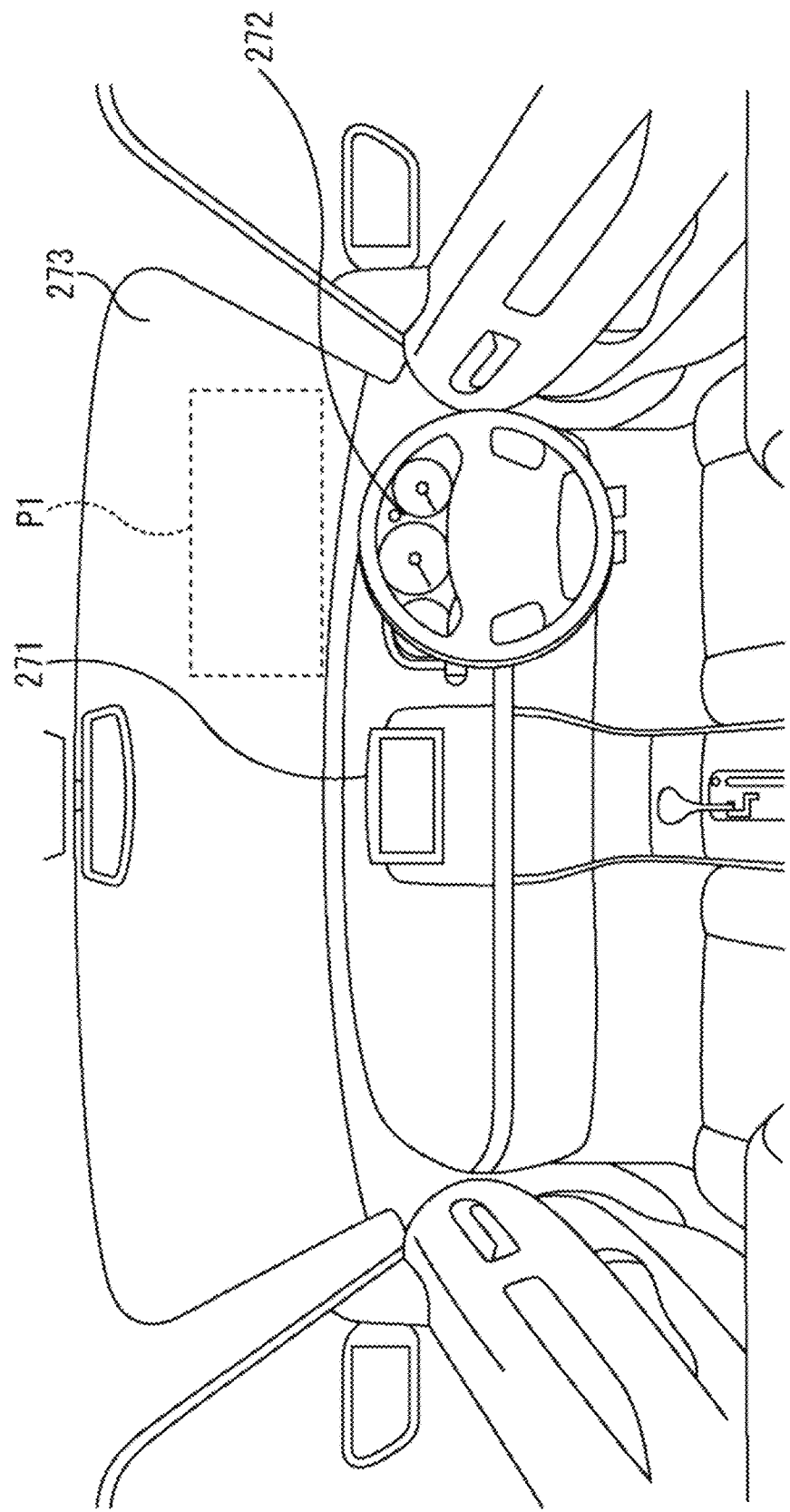
FIG. 10 is a diagram depicting an example of an installation position of a display section.

Next, an arrangement example of the display section 14 will be described with reference to FIG. 10.

Equipment provided in advance in the ego vehicle may be used as the display section 14 or a dedicated display or the like may be provided as the display section 14. For example, a display 271 of a car navigation system of the ego vehicle or an instrument panel 272 can be used as the display section 14. In addition, for example, the display section 14 can include a transmissive display superimposed and provided on an area P1 of a windshield 273 of the ego vehicle in front of the driver's seat.

<1-11. Surrounding Monitoring Processing>

Figure 11:
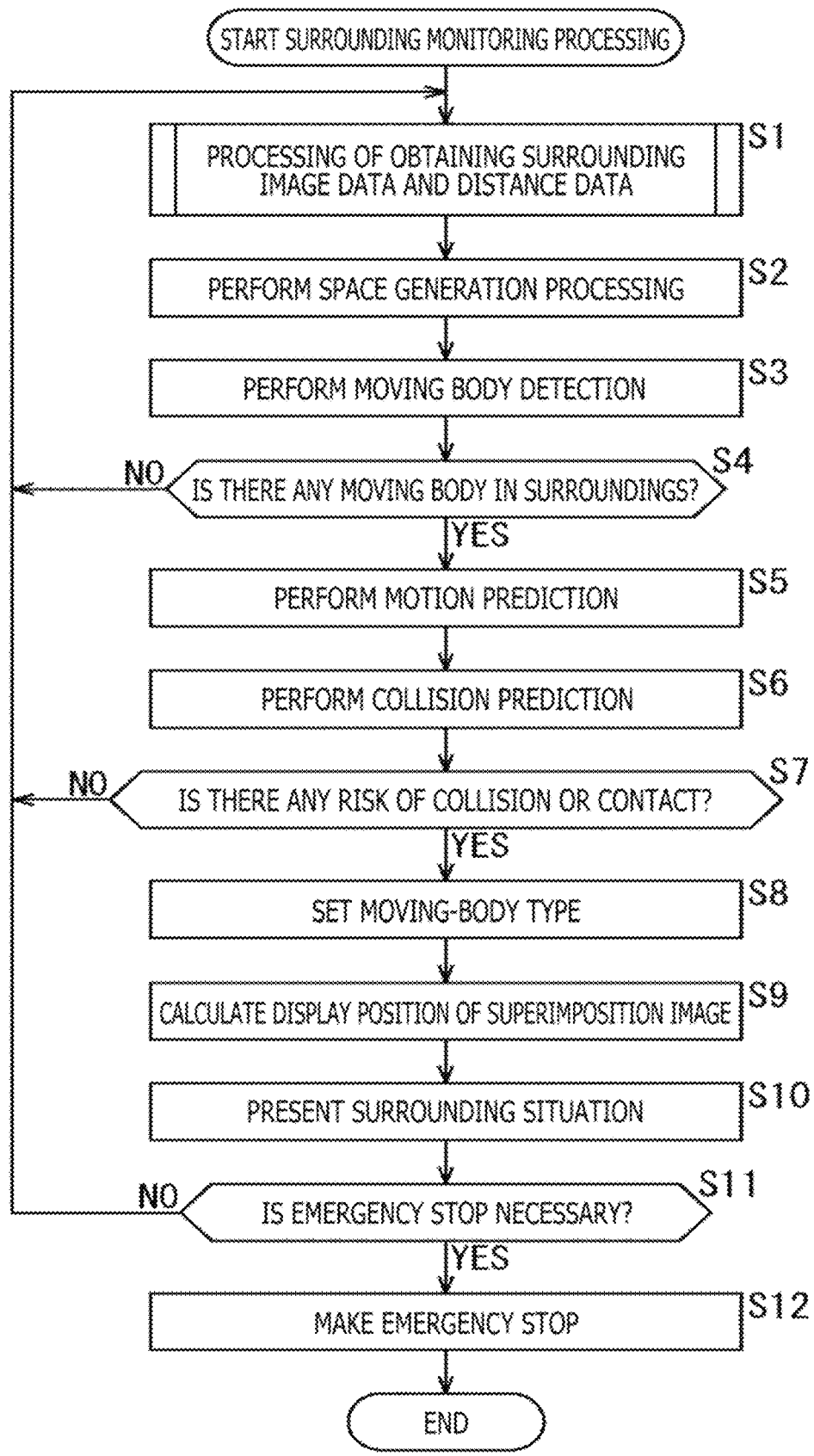
FIG. 11 is a flowchart for explaining surrounding monitoring processing.

Next, the surrounding monitoring processing executed by the in-vehicle system 10 will be described with reference to a flowchart in FIG. 11. This processing starts, for example, when the operation for activating the ego vehicle and starting driving has been performed, for example, when an ignition switch, a power switch, a start switch, or the like of the ego vehicle has been turned on. In addition, this processing ends, for example, when the operation for ending driving has been performed, for example, when the ignition switch, the power switch, the start switch, or the like of the ego vehicle has been turned off.

In step S1, the information processing section 13 controls the imaging control section 11, causing the imaging control section 11 to execute processing of obtaining surrounding image data and distance data of the vehicle 100, and obtains the surrounding image data and the distance data. Specifically, the surrounding situation detecting section 31 controls the imaging control section 11 to obtain the surrounding image data and the distance data of the vehicle 100 based on images imaged by the camera system 10. At this point in time, the imaging control section 11 controls the camera system 10, causing the camera system 10 to execute the processing of obtaining the surrounding image data and the distance data and obtain the surrounding image data and the distance data of the vehicle 100. The distance data are stereo distance measurement results. The motion prediction section 32 obtains vehicle sensor data from each sensor of the vehicle information sensor 12. Incidentally, the details of the processing of obtaining the surrounding image data and the distance data will be described later with reference to a flowchart in FIG. 12.

In step S2, the space generation section 41 performs space generation processing. That is, the space generation section 41 generates (or updates) a three-dimensional space map illustrating the shapes, the positions, and the like of objects in the surroundings of the ego vehicle on the basis of the surrounding image data and the distance data. Incidentally, the objects in the surroundings of the ego vehicle include not only moving bodies but also stationary objects (a building and a road surface, for example). The space generation section 41 supplies the generated three-dimensional space map to the motion prediction section 32 and the HMI control section 34.

Incidentally, any method can be used as a method for generating the three-dimensional space map. For example, a technique such as SLAM (Simultaneous Localization and Mapping) is used.

In step S3, the moving body detecting section 42 performs moving body detection. Specifically, the moving body detecting section 42 detects moving bodies in the surroundings of the ego vehicle on the basis of surrounding sensor data and the three-dimensional space map. For example, the moving body detecting section 42 detects the presence or absence of moving bodies in the surroundings of the ego vehicle, the types, sizes, shapes, positions, and the like of the moving bodies. The moving body detecting section 42 supplies the detection result of moving bodies to the motion prediction section 32 and the HMI control section 34.

Incidentally, any method can be used as a moving body detection method. In addition, moving bodies to be detected include not only moving bodies that are actually moving, but also moving bodies that are temporarily stationary, such as a vehicle and a bicycle that have stopped and a pedestrian who has stopped.

Further, the moving body detecting section 42 can also detect moving bodies in the surroundings of the ego vehicle only on the basis of the surrounding sensor data without using the three-dimensional space map, for example. In this case, it is possible to reverse the processing in step S2 and the processing in step S3.

In step S4, the moving body detecting section 42 determines whether or not there is any moving body in the surroundings on the basis of the result of the processing in step S3. In a case where the moving body detecting section 42 has determined that there is no moving body in the surroundings, the processing returns to step S1.

After that, the processing in steps S1 to S4 is repeatedly executed until it is determined in step S4 that there is a moving body in the surroundings.

On the other hand, in a case where it has been determined that there is a moving body in the surroundings in step S4, the processing proceeds to step S5.

In step S5, the motion prediction section 32 performs motion prediction. Specifically, the motion prediction section 32 predicts the moving speed, the moving direction, and the like of the ego vehicle on the basis of the vehicle sensor data. In addition, the motion prediction section 32 predicts the moving speeds, the moving directions, and the like of the moving bodies in the surroundings of the ego vehicle on the basis of the three-dimensional space map and the detection result of the moving bodies in the surroundings of the ego vehicle. The motion prediction section 32 supplies the prediction results to the collision prediction section 33 and the HMI control section 34.

Incidentally, any method can be used as a motion prediction method.

In step S6, the collision prediction section 33 performs collision prediction. Specifically, on the basis of the prediction results of the motion of the ego vehicle and the moving bodies in the surroundings of the ego vehicle, the collision prediction section 33 predicts whether or not there is any possibility that the moving bodies in the surroundings of the ego vehicle collide or contact with the ego vehicle, and also predicts the time until the occurrence of a collision or contact with any moving body that may collide or contact with the ego vehicle (hereinafter referred to as predicted collision time).

In addition, the collision prediction section 33 predicts the risk level of collision or contact of each moving body with the ego vehicle, and sets a rank on the basis of a predetermined definition. For example, any moving body that is stationary and any moving body that is moving in a direction away from the ego vehicle are set as risk level 1. Among moving bodies that are moving in a direction approaching the ego vehicle, any moving body with the predicted collision time of more than T1 seconds (for example, five seconds) is set as risk level 2. Among the moving bodies that are moving in the direction approaching the ego vehicle, any moving body with the predicted collision time of T1 seconds or less and more than T2 seconds (for example, one second) is set as risk level 3. Among the moving bodies that are moving in the direction approaching the ego vehicle, any moving body with the predicted collision time of T2 seconds or less is set as risk level 4.

Incidentally, any moving body that is stationary and any moving body that is moving in a direction away from the ego vehicle may also be set as one of risk levels 2 to 4 on the basis of the predicted collision time.

The collision prediction section 33 supplies the collision prediction result to the HMI control section 34 and the braking control section 15.

In step S7, the collision prediction section 33 determines whether or not there is any risk of collision or contact. For example, in a case where there is no moving body with risk level 3 or higher in the surroundings of the ego vehicle, the collision prediction section 33 determines that there is no risk of collision or contact and the processing returns to step S1.

After that, the processing in steps S1 to S7 is repeatedly executed until it is determined in step S7 that there is a risk of collision or contact.

On the other hand, in step S7, for example, in a case where there is a moving body with risk level 3 or higher in the surroundings of the ego vehicle, the collision prediction section 33 determines that there is a risk of collision or contact and the processing proceeds to step S8.

In step S8, the HMI control section 34 sets a moving-body type. For example, the HMI control section 34 classifies any moving body detected by the moving body detecting section 42 into one of five types: a vehicle, a motorbike, a bicycle, a pedestrian, and others. Incidentally, although a motorbike is a type of vehicle, the motorbike is distinguished from the other vehicles here.

In step S9, the HMI control section 34 calculates the display position of each superimposition image. Each superimposition image includes a frame and a bar, for example. The frame (hereinafter referred to as a moving-body frame) represents the position of a corresponding moving body. The bar (hereinafter referred to as a motion prediction bar) represents a predicted motion of the corresponding moving body.

Accordingly, the HMI control section 34 calculates the display position of the moving-body frame corresponding to each moving body on the three-dimensional space map on the basis of the position of each moving body on the three-dimensional space map and the height, width, and the like of each moving body viewed from the traveling direction of each moving body.

In addition, the HMI control section 34 calculates the position of each moving body after x seconds (for example, after one second) on the three-dimensional space map on the basis of the result of motion prediction of each moving body. Next, the HMI control section 34 calculates the display position of the motion prediction bar corresponding to each moving body on the three-dimensional space map on the basis of the current position of each moving body and the position thereof after x seconds on the three-dimensional space map. For example, the HMI control section 34 calculates the length and direction of the motion prediction bar by using the leading end of the traveling direction of each moving body at present as a starting point and the leading end of the traveling direction of each moving body after x seconds as an end point.

In step S10, the in-vehicle system 10 presents the surrounding situation. Specifically, the HMI control section 34 converts the display positions of the superimposition images (moving-body frames, motion prediction bars, and the like) on the three-dimensional space map into the display positions on a surrounding image to be presented to the driver. In addition, the HMI control section 34 converts the position of the road surface on the three-dimensional space map into the display position on the surrounding image and calculates the display position of the grid indicating the position of the road surface on the surrounding image. Then, the HMI control section 34 generates surrounding monitoring image data representing a surrounding monitoring image and supplies the surrounding monitoring image data to the display section 14, causing the display section 14 to display the surrounding monitoring image.

In step S11, the braking control section 15 determines whether or not an emergency stop is necessary. For example, in a case where there is no moving body with risk level 4 among moving bodies in the surroundings of the ego vehicle, the braking control section 15 determines that the emergency stop is not necessary, and the processing returns to step S1.

After that, the processing in steps S1 to S11 is repeatedly executed until it is determined in step S11 that the emergency stop is necessary.

On the other hand, in step S11, for example, in a case where there is a moving body with risk level 4 among moving bodies in the surroundings of the ego vehicle, the braking control section 15 determines that the emergency stop is necessary, and the processing proceeds to step S12.

In step S12, the braking control section 15 controls the braking apparatus 16, causing the braking apparatus 16 to make an emergency stop of the ego vehicle. This prevents a collision or a contact with the moving body in the surroundings of the ego vehicle.

After that, the surrounding monitoring processing ends.

As described above, the notification of the risk of collision or contact with the moving body in the surroundings of the ego vehicle can be given in an easy-to-understand manner and the driver can surely recognize the risk of collision or contact. In addition, in a case where there is a moving body with risk level 4, an emergency stop is performed. This prevents the occurrence of an accident.

<1-12. Processing of Obtaining Surrounding Image Data and Distance Data>

Figure 12:
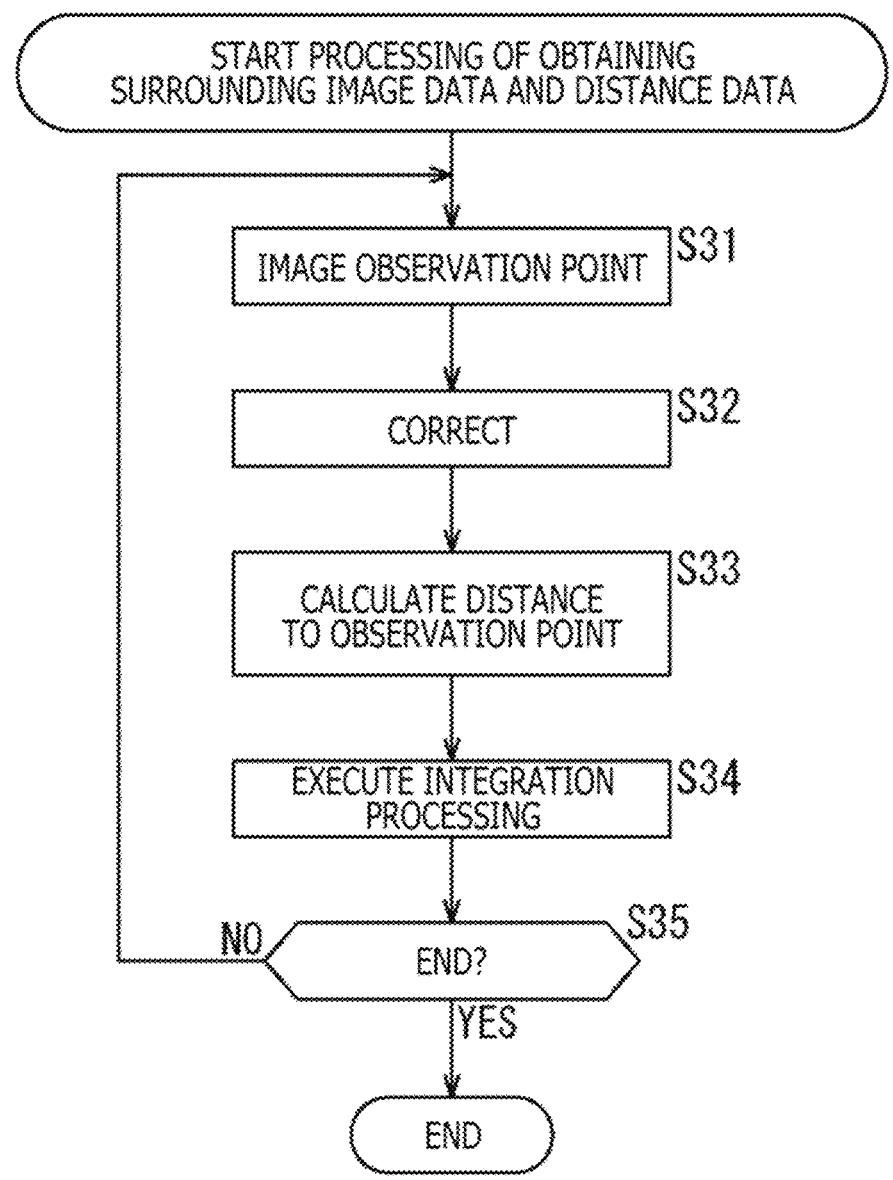
FIG. 12 is a flowchart explaining processing of obtaining sensor information.

Next, the processing of obtaining the surrounding image data and the distance data will be described with reference to a flowchart in FIG. 12.

In step S31, the camera 131 and the camera 132 included in the stereo camera system 111 image an observation point.

In step S32, the image correction section 171 corrects lens aberration, camera image distortion, and the like for the image imaged by the camera 131. Similarly, the image correction section 172 corrects lens aberration, camera image distortion, and the like for the image imaged by the camera 132. That is, to calculate the distance, the image distortion is corrected and the image is projected on a virtual plane to be formed as a plane image.

In step S33, the stereo image processing section 173 calculates the distance to the observation point and outputs the imaged images including the plane images to the integration section 152 as the surrounding image data, together with the distance data. That is, the camera 131 and the camera 132 are arranged at positions separated by the distance L in the vertical direction. Therefore, the image imaged by the camera 131 and the image imaged by the camera 132 have a phase difference. The distance to the observation point can be calculated on the basis of the phase difference. That is, an object corresponding to an object depicted in one of the images imaged by the cameras 131 and 132 is detected from the other image, and the distance is calculated from the shift of the position of the object in the two images. Incidentally, the above processing is executed by each of the stereo camera systems 111A and 111B respectively provided on the left and right front side surfaces of the vehicle 100.

In step S34, the integration section 93 integrates the measurement data and the surrounding image data of each of the stereo camera systems 111A and 111B, and outputs the measurement data to the imaging control section 11 as distance data of the vehicle 100 in all directions, together with the surrounding image data.

In step S35, the stereo image processing section 173 determines whether to end the process. In a case where the end of the processing has not been instructed by the user yet, the processing returns to step S31 and the subsequent processing is repeated. In a case where the end of the processing has been instructed, the processing ends.

By the above processing, the stereo distance measuring sections 151A and 151B individually output the distance data, which are the distance measurement results in the respective detection ranges 112A and 112B, to the integration section 152 together with the surrounding image data, and the distance data are sequentially and repeatedly output to the imaging control section 11.

In addition, as described above, when the cameras 131 and 132 image the detection range in step S31, the pixel signal of the uppermost pixel and then the pixel signals of the pixels adjacent in the downward direction are sequentially read, or the pixel signal of the lowermost pixel and then the pixel signals of the pixels adjacent in the upward direction are sequentially read in each pixel column in order from the pixel column on the front side of the vehicle 100 to the rear pixel column adjacent in the horizontal direction.

By reading the pixel signals in this manner, as described above, it is possible to suppress the focal plane distortion of the subject in the image imaged by each of the cameras 131 and 132 and occurrence of the shift of the subject in the horizontal direction due to the shift of the read timing. Since the subjects in the respective images can be recognized as the same subject, it is possible to realize distance measurement with high accuracy using the shift based on the parallax.

Incidentally, with the example of the configuration above, the imaging control section 11 measures the distances to the subjects (target objects) in the respective surrounding images as the distance data in the described example. However, the distance data measurement itself may be realized by another configuration. For example, the space generation section 41 may simultaneously generate the distance data and the three-dimensional space map.

In addition, in the example described above, the processing of detecting the moving-body type (type such as a pedestrian or an automobile, for example) is performed by the moving body detecting section 42. However, the processing may be performed by another configuration and may be performed by the imaging control section 11, for example.

2. Modification

In the example described above, the stereo camera system 111 includes the cameras 131 and 132 arranged in line on the front side surface portion of the vehicle 100 such that parallax occurs in the vertical direction. However, the stereo camera system 111 may be arranged at a position other than the front of the vehicle body of the vehicle 100 such that parallax of the cameras 131 and 132 occurs in the vertical direction.

For example, the stereo camera system 111 may be provided at a position near a center side surface portion of the vehicle 100 such that the cameras 131 and 132 image a side surface direction so as to generate parallax in the vertical direction.

Figure 13:
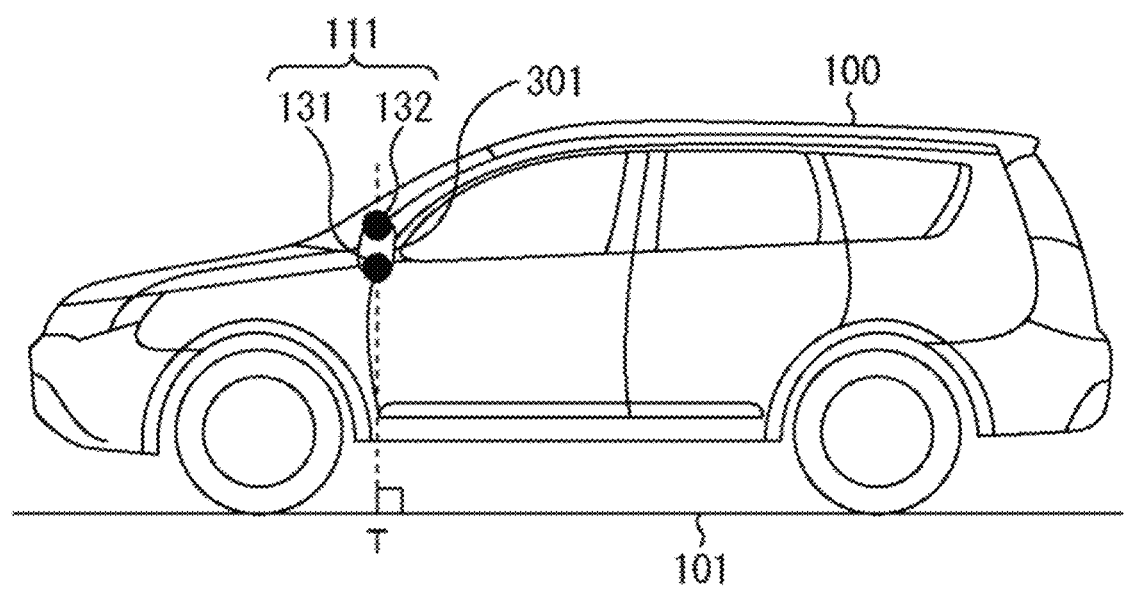
FIG. 13 is a diagram depicting a modification of the appearance configuration of the stereo camera system.

More specifically, for example, as depicted in FIG. 13, the stereo camera system 111 may be provided such that the cameras 131 and 132 are mounted in line on a door mirror 301 in the vertical direction so as to generate parallax of the cameras 131 and 132 in the vertical direction.

Incidentally, as long as the stereo camera system 111 is provided near the center side surface portion of the vehicle 100, the stereo camera system 111 may be mounted at a position other than the door mirror 301 and may be mounted on a pillar (a front pillar, a center pillar, a rear pillar, or the like), a door, or a roof rail, for example.

Figure 14:
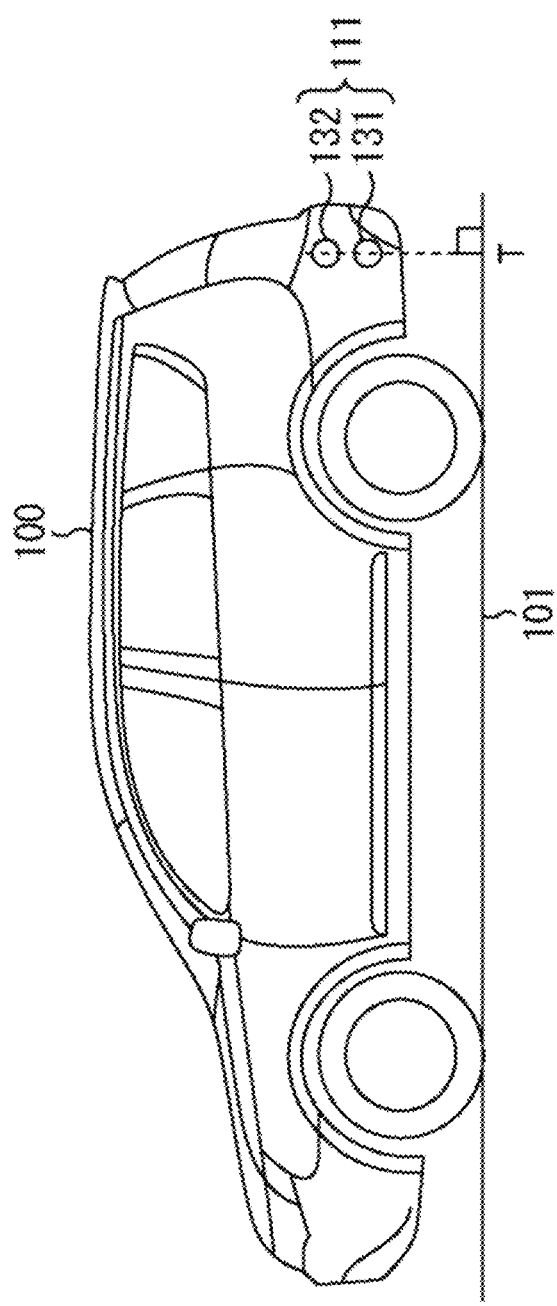
FIG. 14 is a diagram depicting a modification of the appearance configuration of the stereo camera system.

In addition, as depicted in FIG. 14, the stereo camera system 111 may be mounted on a rear side surface portion of the vehicle 100 such that the cameras 131 and 132 generate parallax in the vertical direction.

Further, as depicted in FIG. 14, in a case where the cameras 131 and 132 are mounted on the rear side surface portion of the vehicle 100 so as to generate parallax in the vertical direction, the stereo camera system 111 is more often used at the time of backward movement. Therefore, the pixel signals in a detection range on the rear side of the side surface may be read at a higher speed.

For example, the pixel signal of the uppermost pixel and then the pixel signals of the pixels adjacent in the downward direction may be sequentially read or the pixel signal of the lowermost pixel and then the pixel signals of the pixels adjacent in the upward direction may be sequentially read for each pixel column from the pixel column on the rear side of each of the pixel arrays of the cameras 131 and 132.

Figure 15:
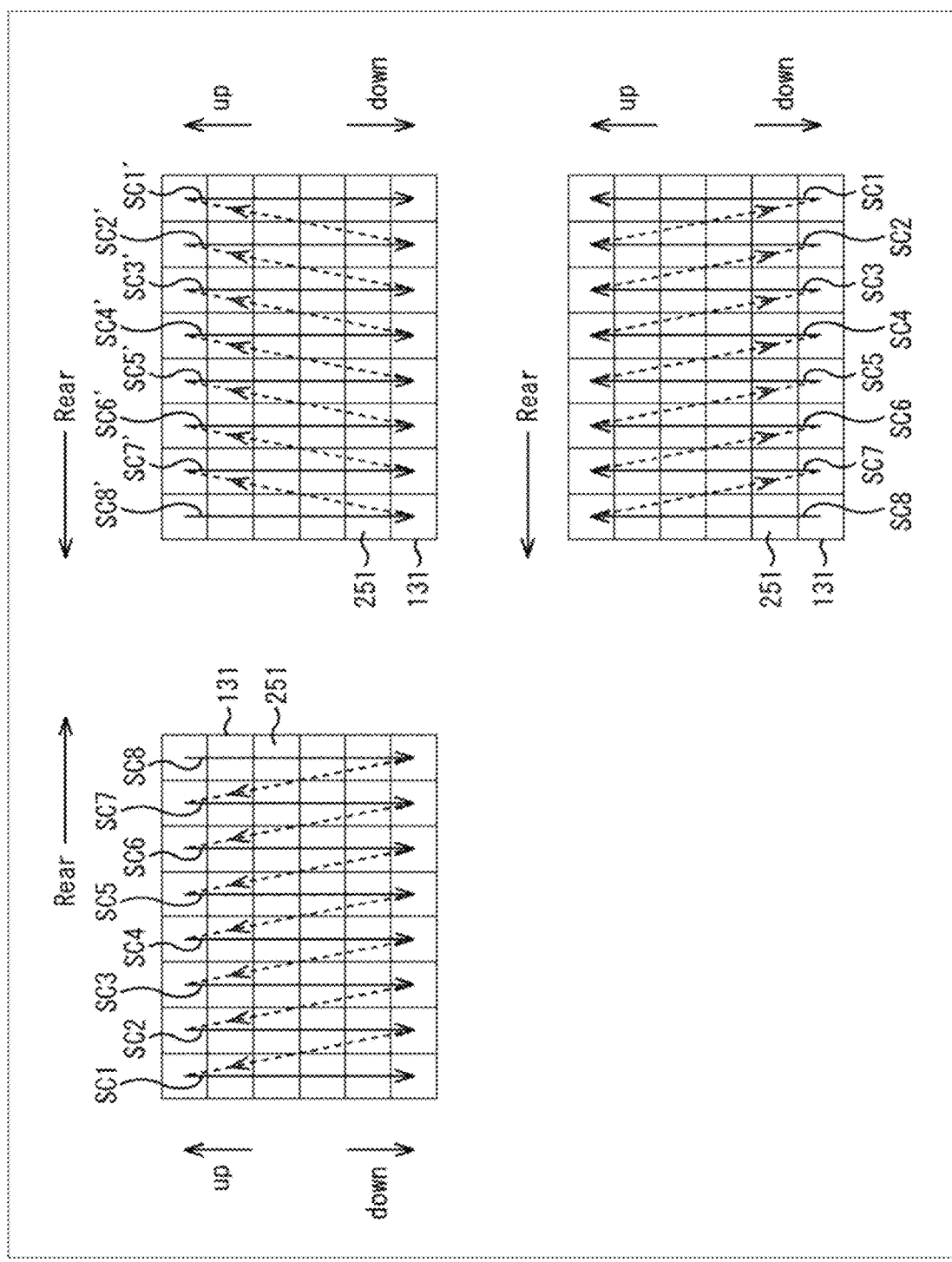
FIG. 15 is a diagram explaining another example of the order in which the camera of the stereo camera system according to the present disclosure reads pixel signals.

That is, as depicted in an upper left portion of FIG. 15, for example, in a case where the camera 131 is provided on a rear-left side surface portion, first, the pixel signals of the pixels in a column SC8 on the rear side of the vehicle 100 are sequentially read in the downward direction from the uppermost pixel in the figure. When the pixel signal of the lowermost pixel 251 has been read, the pixel signals are sequentially read in the downward direction from the uppermost pixel in an adjacent column SC7. After that, similarly, in order of columns SC6 to SC1, the pixel signal of the uppermost pixel and then the pixel signals of the pixels adjacent in the downward direction are sequentially read for each column.

Incidentally, in the upper left portion of FIG. 15, a right portion in the figure denotes the rear (Rear) of the vehicle 100, an upper portion in the figure denotes the upper part (up) of the vehicle 100, and a lower portion in the figure denotes the lower part (down) of the vehicle 100.

In addition, as depicted in an upper right portion of FIG. 15, for example, in a case where the camera 131 is provided on a rear-right side surface portion, the pixel signals of the pixels in a column SC8' on the rear side of the vehicle 100 are sequentially read in the downward direction from the uppermost pixel in the figure. When the pixel signal of the lowermost pixel 251 has been read, the pixel signals are sequentially read in the downward direction from the uppermost pixel in an adjacent column SC7'. After that, similarly, in order of columns SC6' to SC1', the pixel signal of the uppermost pixel is read and then the pixel signals of the pixels adjacent in the downward direction are sequentially read for each column.

Incidentally, in the upper right portion of FIG. 15, a left portion in the figure denotes the rear (Rear) of the vehicle 100, an upper portion in the figure denotes the upper part (up) of the vehicle 100, and a lower portion in the figure denotes the lower part (down) of the vehicle 100.

In addition, in the cameras 131 in the upper left portion and the upper right portion of FIG. 15 in the described example, the pixel signals in each column are sequentially read from the uppermost pixel and then the pixels adjacent in the downward direction. However, the pixel signals may be sequentially read in the upward direction from the lowermost pixel.

Further, while the front-rear direction of the camera 131 relative to the vehicle 100 in the upper left portion of FIG. 15 is maintained, the camera 131 may be turned upside down and installed. In this manner, the camera 131 may be provided on the rear-left side surface portion as depicted in a lower right portion of FIG. 15.

That is, in this case, the camera 131 to be provided on the rear-right side surface portion and the camera 131 to be provided on the left side surface portion do not need to be individually configured as different cameras. Each of the cameras 131 has the same configuration and can be provided on either the left or right side surface portion.

Incidentally, while the front-rear direction of the camera 131 in the upper right portion of FIG. 15 is maintained, the camera 131 may be turned upside down and provided on the left side surface portion.

In this reading order, it is particularly possible to read the pixel signals in the pixel columns on the rear side of the detection range at a higher speed in the backward movement state. By grasping the situation in the traveling direction more quickly, it is possible to realize processing corresponding to the situation in the traveling direction more quickly.

That is, as long as the stereo camera systems 111 are installed on the side surface portions of the vehicle 100, the stereo camera systems 111 may be installed at any position of the front, the center, and the rear or may be installed at positions in combination with at least any of the front, the center, and the rear.

In addition, in a case where the stereo camera systems 111 are installed on the front side surface portion and the rear side surface portion of the vehicle 100, cameras capable of imaging the distance at a narrow angle with a slightly narrowed viewing angle may be employed as the cameras 131 and 132. That is, in a case where the stereo camera systems 111 are installed on the front side surface portion and the rear side surface portion of the vehicle 100, it is possible to more quickly get a grasp of the situation in an intersection by employing the narrow-angle cameras.

Further, in a case where the stereo camera systems 111 are installed on the center side surface portions of the vehicle 100, cameras capable of imaging the vicinity well at a wide angle with a slightly widened viewing angle may be employed as the cameras 131 and 132. That is, in a case where the stereo camera systems 111 are installed on the center side surface portions of the vehicle 100, it is possible to more quickly get a grasp of the situation in a wide range of the sides including the front and the rear by employing the wide-angle cameras.

3. Application Examples

The technology according to the present disclosure can be applied to various products. For example, the technology according to the present disclosure may be implemented as an apparatus to be mounted in any type of mobile body such as an automobile, an electric vehicle, a hybrid electric vehicle, a motorcycle, a bicycle, a personal mobility, an airplane, a drone, a ship, a robot, a construction machine, or an agricultural machine (tractor).

Figure 16:
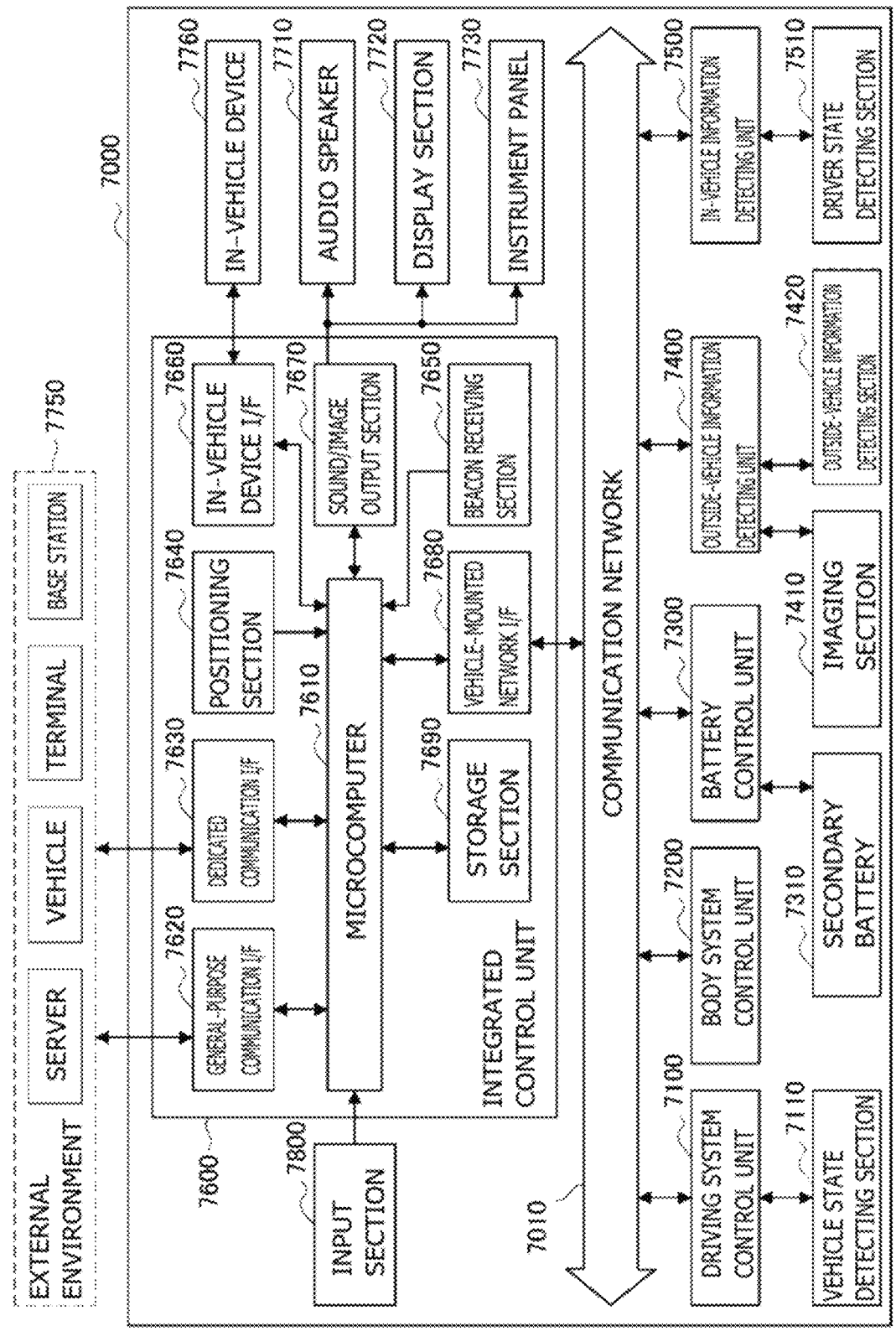
FIG. 16 is a block diagram depicting an example of schematic configuration of a vehicle control system.

FIG. 16 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 16, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 16 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 17:
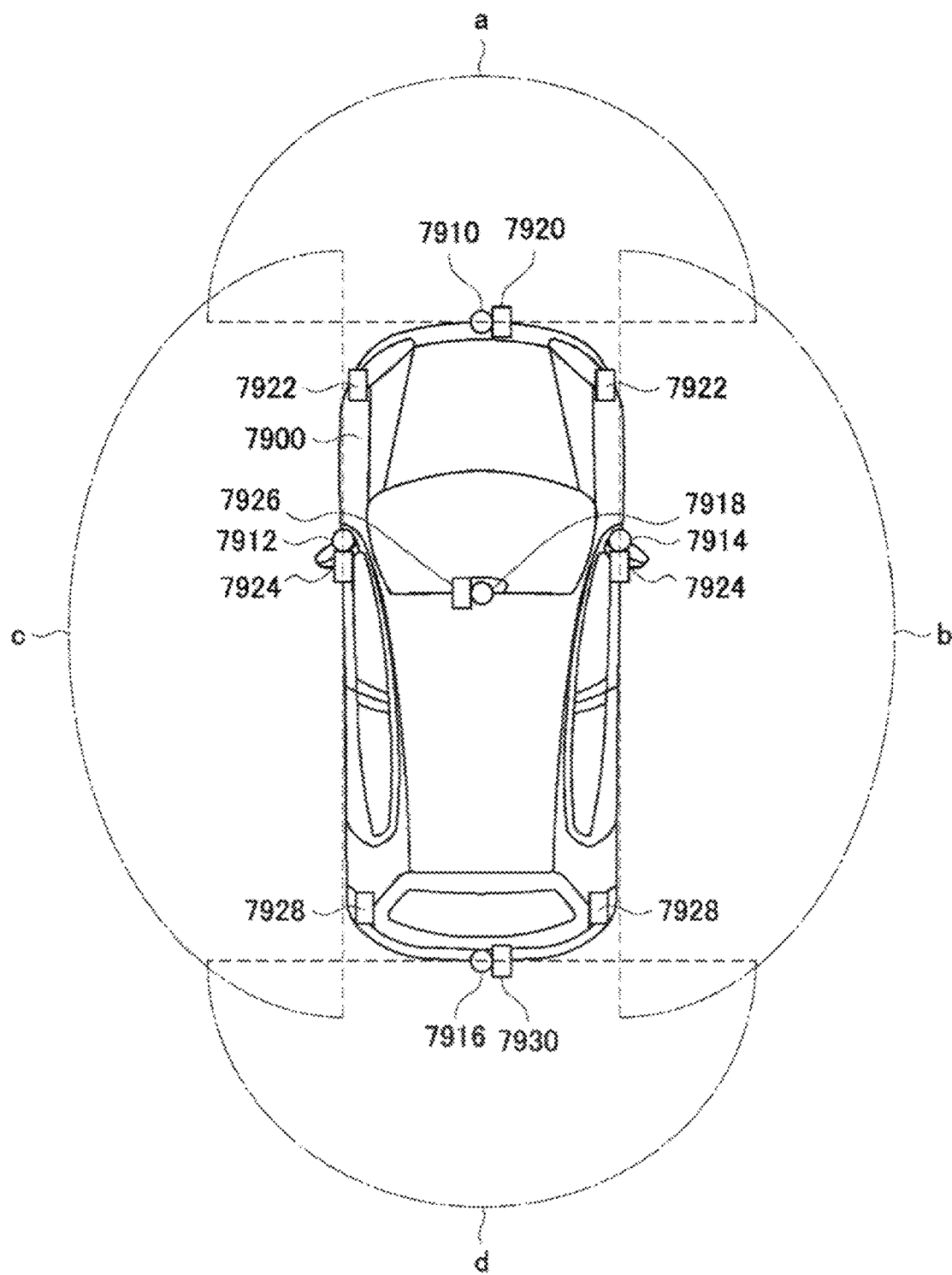
FIG. 17 is a diagram of assistance in explaining an example of installation positions of an outside-vehicle information detecting section and an imaging section.

FIG. 17 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 16, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 16, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 16 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing each function of the imaging control section 11 and the information processing section 13 according to the present embodiment described with reference to FIG. 1 can be implemented in any of the control units and the like. In addition, a computer-readable recording medium in which such a computer program is stored can also be provided. The recording medium is a magnetic disk, an optical disc, a magneto-optical disc, or a flash memory, for example. In addition, the above-described computer program may be distributed via, for example, a network without using the recording medium.

In the vehicle control system 7000 described above, the imaging control section 11 and the information processing section 13 according to the present embodiment described with reference to FIG. 1 can be applied to the integrated control unit 7600 in the application example depicted in FIG. 16. For example, the stereo distance measuring sections 151A and 151B and the integration section 152 of the imaging control section 11 correspond to the microcomputer 7610 of the integrated control unit 7600. For example, the integrated control unit 7600 can obtain the data of the distance to the target object in the surroundings and the surrounding image data by executing the processing of obtaining the distance data and the surrounding image data on the basis of images imaged by the camera system 10.

In addition, at least a part of the components of the imaging control section 11 and the information processing section 13 described with reference to FIG. 1 may be implemented in a module (for example, an integrated circuit module including one die) for the integrated control unit 7600 depicted in FIG. 16. Alternatively, the imaging control section 11 and the information processing section 13 described with reference to FIG. 1 may be implemented by a plurality of control units of the vehicle control system 7000 depicted in FIG. 16.

Incidentally, the present disclosure can also be configured as follows.

<1> An imaging control apparatus including:
a set of cameras mounted in a mobile body and included in a stereo camera system; and
a detection section configured to detect a distance to an observation point in a detection range on the basis of images imaged by the set of cameras,
in which the set of cameras is arranged in line, on a side surface of the mobile body, in a vertical direction relative to a road surface, and configured to sequentially read imaged pixel signals in the vertical direction in units of pixels arranged in an array.

<2> The imaging control apparatus according to <1>, in which each of the set of cameras is configured to read, in order from a column of pixels on a front side of the mobile body, the pixel signals in sequence in the vertical direction for each column.

<3> The imaging control apparatus according to <2>, in which each of the set of cameras is configured to sequentially read, in order from the column of the pixels on the front side of the mobile body, the pixel signals in a direction from bottom to top or in a direction from top to bottom in the vertical direction for each column.

<4> The imaging control apparatus according to <3>, in which the set of cameras is arranged in line, on each of left and right side surfaces of the mobile body, in the vertical direction relative to the road surface, and the set of cameras on each of left and right of the mobile body is configured to sequentially read, in order from the column of the pixels on the front side of the mobile body, the pixel signals in the direction from bottom to top or in the direction from top to bottom in the vertical direction for each column.

<5> The imaging control apparatus according to <3>, in which the set of cameras is arranged in line, on each of left and right side surfaces of the mobile body, in the vertical direction relative to the road surface, and the set of cameras on one of left and right of the mobile body is configured to sequentially read, in order from the column of the pixels on the front side of the mobile body, the pixel signals in the direction from bottom to top in the vertical direction for each column, while the set of cameras on the other one of the left and right is configured to sequentially read, in order from the column of the pixels on the front side of the mobile body, the pixel signals in the direction from top to bottom in the vertical direction for each column.

<6> The imaging control apparatus according to any one of <1> to <5>, in which the set of cameras is each arranged in line, on at least any of a side surface on each of front left and front right of the mobile body, a side surface on each of center left and center right of the mobile body, and a side surface on each of rear left and rear right of the mobile body, such that parallax occurs in the vertical direction relative to the road surface.

<7> The imaging control apparatus according to <6>, in which in a case where the set of cameras is arranged in line, on the side surface on each of the front left and the front right of the mobile body or on the side surface on each of the rear left and the rear right of the mobile body, in the vertical direction relative to the road surface, each of the cameras includes a camera with an angle narrower than a predetermined angle.

<8> The imaging control apparatus according to any one of <6>, in which in a case where the set of cameras is arranged in line, on the side surface of each of the center left and the center right of the mobile body, in the vertical direction relative to the road surface, each of the cameras includes a camera with an angle wider than a predetermined angle.

<9> The imaging control apparatus according to any one of <1> to <8>, in which the pixels of the cameras are arranged in an array such that a width in a horizontal direction is greater than a width in the vertical direction.

<10> The imaging control apparatus according to <9>, in which the pixels of the cameras are arranged in an array such that a ratio of the width in the horizontal direction to the width in the vertical direction is approximately 16:9 or approximately 4:3.

<11> A method for controlling an imaging control apparatus including a detection section configured to detect a distance to an observation point in a detection range on the basis of images imaged by a set of cameras mounted in a mobile body and included in a stereo camera system, the method including a step of sequentially reading, by the set of cameras, imaged pixel signals in a vertical direction in units of pixels arranged in an array, the set of cameras being arranged in line, on a side surface of the mobile body, in the vertical direction relative to a road surface.

<12> A mobile body including:
an imaging control apparatus including
a set of cameras mounted in the mobile body and included in a stereo camera system, and
a detection section configured to detect a distance to an observation point in a detection range on the basis of images imaged by the set of cameras,
the set of cameras being arranged in line, on a side surface of the mobile body, in a vertical direction relative to a road surface, and configured to sequentially read imaged pixel signals in the vertical direction in units of pixels arranged in an array.

REFERENCE SIGNS LIST

1 In-vehicle system, 10 Camera system, 11 Imaging control section, 12 Vehicle information sensor, 13 Information processing section, 14 Display section, 15 Braking control section, 16 Braking apparatus, 31 Surrounding situation detecting section, 32 Motion prediction section, 33 Collision prediction section, 34 HMI control section, 100 Vehicle, 111, 111A, 111B Stereo camera system, 131, 131A, 131B, 132, 132A, 132B Camera, 151, 151A, 151B Stereo distance measuring section, 152 Integration section, 171, 172 Image correction section, 173 Stereo image processing section

The invention claimed is:

1. An imaging control apparatus comprising:
a set of cameras mounted in a mobile body and included in a stereo camera system; and
a detection section configured to detect a distance to an observation point in a detection range on a basis of images imaged by the set of cameras, wherein the set of cameras is arranged in line, on a side surface of the mobile body, in a vertical direction relative to a road surface, and configured to sequentially read imaged pixel signals in the vertical direction in units of pixels arranged in an array;
wherein the set of cameras is each arranged in line, on at least any of a side surface on each of front left and front right of the mobile body, a side surface on each of center left and center right of the mobile body, and a side surface on each of rear left and rear right of the mobile body, such that parallax occurs in the vertical direction relative to the road surface.

2. The imaging control apparatus according to claim 1, wherein each of the set of cameras is configured to read, in order from a column of pixels on a front side of the mobile body, the pixel signals in sequence in the vertical direction for each column.

3. The imaging control apparatus according to claim 2, wherein each of the set of cameras is configured to sequentially read, in order from the column of the pixels on the front side of the mobile body, the pixel signals in a direction from bottom to top or in a direction from top to bottom in the vertical direction for each column.

4. The imaging control apparatus according to claim 3, wherein the set of cameras is arranged in line, on each of left and right side surfaces of the mobile body, in the vertical direction relative to the road surface, and the set of cameras on each of left and right of the mobile body is configured to sequentially read, in order from the column of the pixels on the front side of the mobile body, the pixel signals in the direction from bottom to top or in the direction from top to bottom in the vertical direction for each column.

5. The imaging control apparatus according to claim 3, wherein the set of cameras is arranged in line, on each of left and right side surfaces of the mobile body, in the vertical direction relative to the road surface, and the set of cameras on one of left and right of the mobile body is configured to sequentially read, in order from the column of the pixels on the front side of the mobile body, the pixel signals in the direction from bottom to top in the vertical direction for each column, while the set of cameras on the other one of the left and right is configured to sequentially read, in order from the column of the pixels on the front side of the mobile body, the pixel signals in the direction from top to bottom in the vertical direction for each column.

6. The imaging control apparatus according to claim 1, wherein in a case where the set of cameras is arranged in line, on the side surface on each of the front left and the front right of the mobile body or on the side surface on each of the rear left and the rear right of the mobile body, in the vertical direction relative to the road surface, each of the cameras includes a camera with an angle narrower than a predetermined angle.

7. The imaging control apparatus according to claim 1, wherein in a case where the set of cameras is arranged in line, on the side surface of each of the center left and the center right of the mobile body, in the vertical direction relative to the road surface, each of the cameras includes a camera with an angle wider than a predetermined angle.

8. The imaging control apparatus according to claim 1, wherein the pixels of the cameras are arranged in an array such that a width in a horizontal direction is greater than a width in the vertical direction.

9. The imaging control apparatus according to claim 8, wherein the pixels of the cameras are arranged in an array such that a ratio of the width in the horizontal direction to the width in the vertical direction is approximately 16:9 or approximately 4:3.

10. A method for controlling an imaging control apparatus including a detection section configured to detect a distance to an observation point in a detection range on a basis of images imaged by a set of cameras mounted in a mobile body and included in a stereo camera system, the method comprising:
a step of sequentially reading, by the set of cameras, imaged pixel signals in a vertical direction in units of pixels arranged in an array, the set of cameras being arranged in line, on a side surface of the mobile body, in the vertical direction relative to a road surface;
wherein the set of cameras is each arranged in line, on at least any of a side surface on each of front left and front right of the mobile body, a side surface on each of center left and center right of the mobile body, and a side surface on each of rear left and rear right of the mobile body, such that parallax occurs in the vertical direction relative to the road surface.

11. A mobile body comprising:
an imaging control apparatus including a set of cameras mounted in the mobile body and included in a stereo camera system, and a detection section configured to detect a distance to an observation point in a detection range on a basis of images imaged by the set of cameras, the set of cameras being arranged in line, on a side surface of the mobile body, in a vertical direction relative to a road surface, and configured to sequentially read imaged pixel signals in the vertical direction in units of pixels arranged in an array;

wherein the set of cameras is each arranged in line, on at least any of a side surface on each of front left and front right of the mobile body, a side surface on each of center left and center right of the mobile body, and a side surface on each of rear left and rear right of the mobile body, such that parallax occurs in the vertical direction relative to the road surface.

* * * * *